(12) United States Patent
Happel

US009534368B1

(10) Patent No.: US 9,534,368 B1
(45) Date of Patent: Jan. 3, 2017

(54) VARIABLE FLOW SKIMMER AND SHELF SYSTEM

(71) Applicant: Tom Happel, Cocoa, FL (US)

(72) Inventor: Tom Happel, Cocoa, FL (US)

( * ) Notice: Subject to any disclaimer, the term of this patent is extended or adjusted under 35 U.S.C. 154(b) by 127 days.

(21) Appl. No.: 14/575,523

(22) Filed: Dec. 18, 2014

(51) Int. Cl.
  *E03F 5/14* (2006.01)
  *E03F 1/00* (2006.01)
  *C02F 1/40* (2006.01)

(52) U.S. Cl.
  CPC . *E03F 1/00* (2013.01); *C02F 1/40* (2013.01); *E03F 5/14* (2013.01)

(58) Field of Classification Search
  CPC .......... E03F 5/0403; E03F 5/0404; E03F 5/14; E03F 5/16; B01D 17/0208; B01D 17/0211; B01D 17/0214; B01D 21/0027; B01D 21/0042; C02F 1/40
  USPC ................ 210/747.2, 801, 156, 162, 170.03, 521, 210/532.1, 538, 540
  See application file for complete search history.

(56) References Cited

U.S. PATENT DOCUMENTS

| | | | | |
|---|---|---|---|---|
| 5,378,376 A | * | 1/1995 | Zenner | B01D 21/22 210/540 |
| 7,011,743 B2 | * | 3/2006 | Use | B01D 21/0042 210/170.03 |
| 7,328,809 B2 | * | 2/2008 | Gigas | B01D 11/0453 210/521 |
| 7,846,327 B2 | | 12/2010 | Happel | |
| 8,034,234 B2 | | 10/2011 | Happel | |
| 8,034,236 B1 | | 10/2011 | Happel | |
| 8,083,937 B2 | | 12/2011 | Happel | |
| 8,231,780 B2 | | 7/2012 | Happel | |
| 8,366,923 B1 | | 2/2013 | Happel | |
| 8,393,827 B1 | | 3/2013 | Happel | |
| 8,425,150 B1 | | 4/2013 | Happel | |

(Continued)

FOREIGN PATENT DOCUMENTS

JP  2004353407  12/2004

OTHER PUBLICATIONS

Happel, T., Utility U.S. Appl. No. 14/151,284, filed Jan. 9, 2014, Office Action Summary mailed from the U.S. PTO on Dec. 24, 2014, 12 pages.

*Primary Examiner* — Christopher Upton
(74) *Attorney, Agent, or Firm* — Brian S. Steinberger; Law Office of Brian S. Steinberger, P.A.

(57) ABSTRACT

Devices, apparatus, systems, and methods for retrofitting or providing new water treatment vaults and chambers, with a floatable skimmer on tracks above a solid shelf that constricts and restricts water during low and medium flows for maximum detention time to allow for greater storm water treatment, and for high flows allows for the skimmer to automatically adjust to allow for greater conveyance of storm water flow. The skimmer can have float(s) across an upper edge with side edges having both centering and load bearing wheels that slide up and down within tracks that are mounted to side walls of storm water treatment chambers and vaults. Additional embodiments include multi-chamber vaults and chambers with baffles separating sediment chambers. Additionally screen treatment systems can be used with the chambers and vaults. Additionally, the skimmer panels can be positioned so that lower edges can sit on top of outer edges of the shelfs, or form a gap between the top of the outer edge of the shelf and the lower edge of the moveable panel, or have a gap between a hanging down skimmer panel and a front edge of the shelf.

19 Claims, 43 Drawing Sheets

(56) References Cited

U.S. PATENT DOCUMENTS

| | | |
|---|---|---|
| 8,491,797 B1 | 7/2013 | Happel |
| 8,622,652 B1 | 1/2014 | Happel |
| 8,651,767 B1 | 2/2014 | Happel |
| 9,340,965 B2 | 5/2016 | Happel |
| 2003/0026659 A1 | 2/2003 | Wu |
| 2009/0166279 A1 | 7/2009 | Happel |
| 2011/0168612 A1 | 7/2011 | Happel |

* cited by examiner

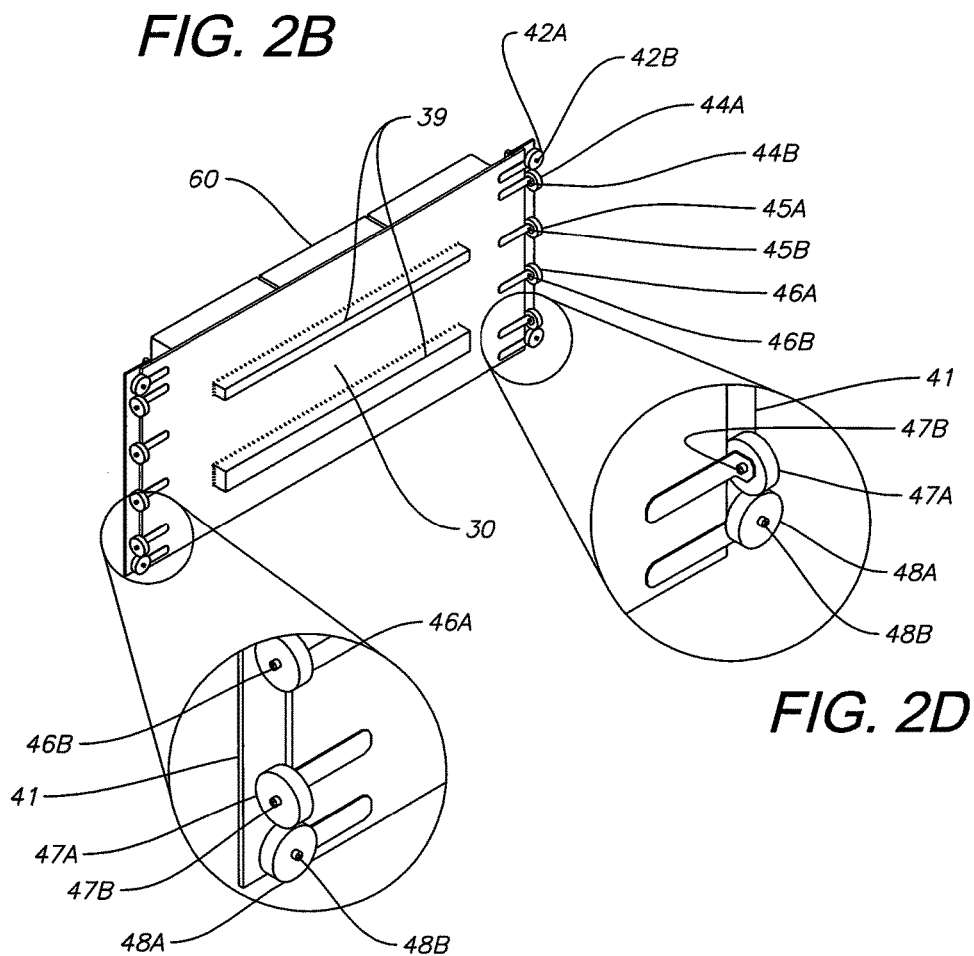
FIG. 2B
FIG. 2D
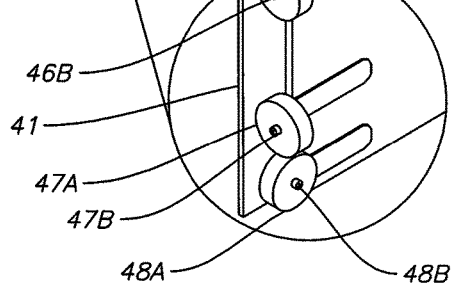
FIG. 2C

VARIABLE FLOW SKIMMER AND SHELF SYSTEM

FIELD OF INVENTION

This invention relates to storm water treatment systems, and in particular to devices, apparatus, systems, and methods for retrofitting or providing new storm water treatment vaults and chambers, with a floatable skimmer on tracks above a shelf that constricts and restricts water during low and medium flows for maximum detention time to allow for greater storm water treatment, and for high flows allows for the skimmer to automatically adjust to allow for greater conveyance of storm water flow.

BACKGROUND AND PRIOR ART

Traditional and common skimmers generally have vertical sides with a lower open bottom. The vertical sides make use of a hydraulic pressure differential between the front side and back side of the skimmer to direct the water flow down and pass it through the open bottom. Once the flow passes through the open bottom flow will be conveyed downstream. The intention is that debris or liquids that float due to buoyancy will not be able to move downward into the water column to pass through the open bottom of the skimmer.

A problem with the traditional and common skimmers is the balance between headloss that they create and the need to pass water flow to prevent flooding. When the opening under a skimmer is relatively large it will have less headloss, a greater water conveyance, but less treatment potential. When the opening is relatively small under a skimmer it will have greater headloss, less water conveyance, but greater treatment.

As such, the traditional and common skimmers do not allow for maximum detention time to allow for capturing contaminates such as foliage, litter, and sediments, and lighter than water liquids such as petroleum products. In short, to treat the storm water flow to prevent pollutants from being conveyed downstream to a receiving body of water. This process of treating the water flow can create headloss which could impede the flow and reduce the rate of flow.

Additionally, if the treatment results in a significant reduction in the rate of flow, flooding can occur upstream from the stormwater treatment structure.

As such, minimizing the headloss caused by a treatment system is important, especially when a treatment system is retrofitted to a pre-existing drain pipe or ditchline.

Thus, the need exists for solutions to the above problems with the prior art.

SUMMARY OF THE INVENTION

A primary objective of the present invention is to provide devices, apparatus, systems, and methods for retrofitting or providing new storm water treatment vaults and chambers, with a floatable skimmer on tracks above a shelf that constricts and restricts water during low and medium flows for maximum detention time to allow for greater storm water treatment, and for high flows allows for the skimmer to automatically adjust to allow for greater conveyance of storm water flow.

A secondary objective of the present invention is to provide devices, apparatus, systems, and methods for retrofitting or providing new storm water treatment vaults and chambers, with a floatable skimmer on tracks above a shelf for treating a storm drain pipe or stormwater conveyance by capturing contaminates such as foliage, litter, and sediments, and lighter than water liquids such as petroleum products.

A third objective of the present invention is to provide devices, apparatus, systems, and methods for retrofitting or providing new storm water treatment vaults and chambers, with a floatable skimmer on tracks above a shelf, in order to treat the storm water flow to prevent pollutants from being conveyed downstream to a receiving body of water.

A fourth objective of the present invention is to provide devices, apparatus, systems, and methods for retrofitting or providing new storm water treatment vaults and chambers, with a floatable skimmer on tracks above a shelf, in order to minimize headloss and prevent flooding from occurring upstream from the stormwater treatment structures.

A fifth objective of the present invention is to provide devices, apparatus, systems, and methods for retrofitting or providing new storm water treatment vaults and chambers, with a floatable skimmer on tracks above a shelf, so that during high flows flow constriction is automatically reduced allowing for greater conveyance of water and preventing flooding form occurring upstream from the treatment structures.

A sixth objective of the present invention is to provide devices, apparatus, systems, and methods for retrofitting or providing new storm water treatment vaults and chambers, with a floatable skimmer on tracks above a shelf, so that during low to medium flows maximizing of treatment occurs in the treatment structures.

A seventh objective of the present invention is to provide devices, apparatus, systems and methods for retrofitting or providing new storm water treatment vaults and chambers with a high level of storm water treatment that is accomplished without the use of media which saves on operating expenses.

A system for retrofitting storm water treatment chambers and vaults with a hydro-variant and skimmer shelf assembly, can include a floatable skimmer panel having sides adaptable for being slidably mounted to opposing walls in a storm water treatment chamber in front of an outlet port to the chamber, the floatable skimmer having a moveable panel with an upper edge, a lower edge and side edges, and a generally horizontal solid shelf adapted to be mounted to an outlet wall of the storm water treatment chamber, the shelf having a front edge adjacent to the lower edge of the moveable panel, wherein the floatable skimmer moves up and down with the flow rate of storm water passing into an inlet port to the chamber.

The generally horizontal shelf can be perpendicular to the outlet wall of the storm water treatment chamber.

The generally horizontal shelf can be at an incline to the outlet wall of the storm water treatment chamber.

The floatable skimmer panel can include at least one float attached adjacent to the upper edge of the moveable panel.

The system can include a first track attached to one of the opposing walls of the chamber for allowing a first side edge of the moveable panel to slide up and down therein, and a second track attached to one of the opposing walls of the chamber for allowing a second side edge of the moveable panel to slide up and down therein.

Sides of the skimmer panel can include a first set of wheels attached to the first side edge of the moveable panel for rotating within the first track, and a second set of wheels attached to the second side edge of the moveable panel for rotating within the second track.

The first set of wheels, and the second set of wheels, can each include a plurality of centering wheels attached to each side edge of the panel which each rotates in a plane parallel to a surface plane of the panel, and a plurality of load wheels attached to each side edge of the panel which each rotates in a plane perpendicular to the surface of the panel.

The first set of wheels and the second set of wheels, can each include an upper centering wheel attached to an upper side edge of the panel which rotates in a plane parallel to the plane of the panel, a plurality of load wheels attached along a middle side edge portion of the panel which rotates in a plane perpendicular to the plane of the panel, and a lower centering wheel attached to a lower edge of the panel which rotates in a plane parallel to the plane of the panel.

The plurality of load wheels can include at least two load wheels equally spaced apart from one another.

The plurality of load wheels can include at least five load wheels equally spaced apart from one another.

The plurality of load wheels can include: eight load wheels equally spaced apart from one another.

The lower edge of the skimmer panel can sit on the front edge of the horizontal shelf during no flow conditions.

The lower edge of the skimmer panel can have a gap opening on top of the front edge of the horizontal shelf during no flow conditions.

The lower edge of the skimmer panel can have a gap opening with the front edge of the horizontal shelf during no flow conditions, and the lower edge of the skimmer panel is at the same level with the front edge of the horizontal shelf.

The lower edge of the skimmer panel can hang below on the front edge of the horizontal shelf with a gap therebetween during no flow conditions.

The treatment chamber can be a multi-chamber treatment chamber. The multi-chamber treatment chamber can include at least one vertical baffle. The multi-chamber treatment chamber can include a screen system over the at least one baffle.

A system for providing storm water treatment in vaults and chambers with a hydro-variant and skimmer shelf assembly, can include a floatable skimmer panel having sides adaptable for being slidably mounted to opposing walls in a storm water treatment chamber or vault in front of an outlet port to the chamber or vault, the floatable skimmer having a moveable panel with an upper edge, a lower edge and side edges, and a generally horizontal solid shelf adapted to be mounted to an outlet wall of the storm water treatment chamber or vault, the shelf having a front edge adjacent to the lower edge of the moveable panel, wherein the floatable skimmer moves up and down with the flow rate of storm water passing into an inlet port to the chamber or vault.

A method of constricting and restricting water during low and medium flows in a storm water treatment chamber or vault for maximizing treatment detention time, can include the steps of providing a storm water treatment chamber or vault with an inlet wall having an inlet port, side walls, a bottom with at least one settling chamber, and an outlet wall with an outlet port, providing a solid shelf having a front edge, side edges and a rear edge, mounting the side edges and rear edge of the shelf in a generally horizontal orientation against the side walls and an outlet wall of the storm water treatment chamber and vault, the shelf located below the outlet port in the outlet wall, mounting a vertically moveable floatable skimmer adjacent to the front edge of the horizontally oriented shelf, constricting and restricting storm water flow passing into the inlet port of the chamber and vault during flow volumes into the chamber for maximum detention time to allow for capturing contaminants in the settling chamber during storm water treatment, and minimizing headloss and preventing flooding from occurring upstream from the storm water treatment chamber and vault.

Further objects and advantages of this invention will be apparent from the following detailed description of the presently preferred embodiments which are illustrated schematically in the accompanying drawings.

BRIEF DESCRIPTION OF THE FIGURES

Single Chamber/Vault

FIG. 2B is a rear perspective view of the skimmer with float of FIG. 2A

FIG. 2C is an enlarged view of the lower left corner of the skimmer of FIG. 2B.

FIG. 2D is an enlarged view of the lower right corner of the skimmer of FIG. 2B

Multi-Chamber Vault

Figure 14:
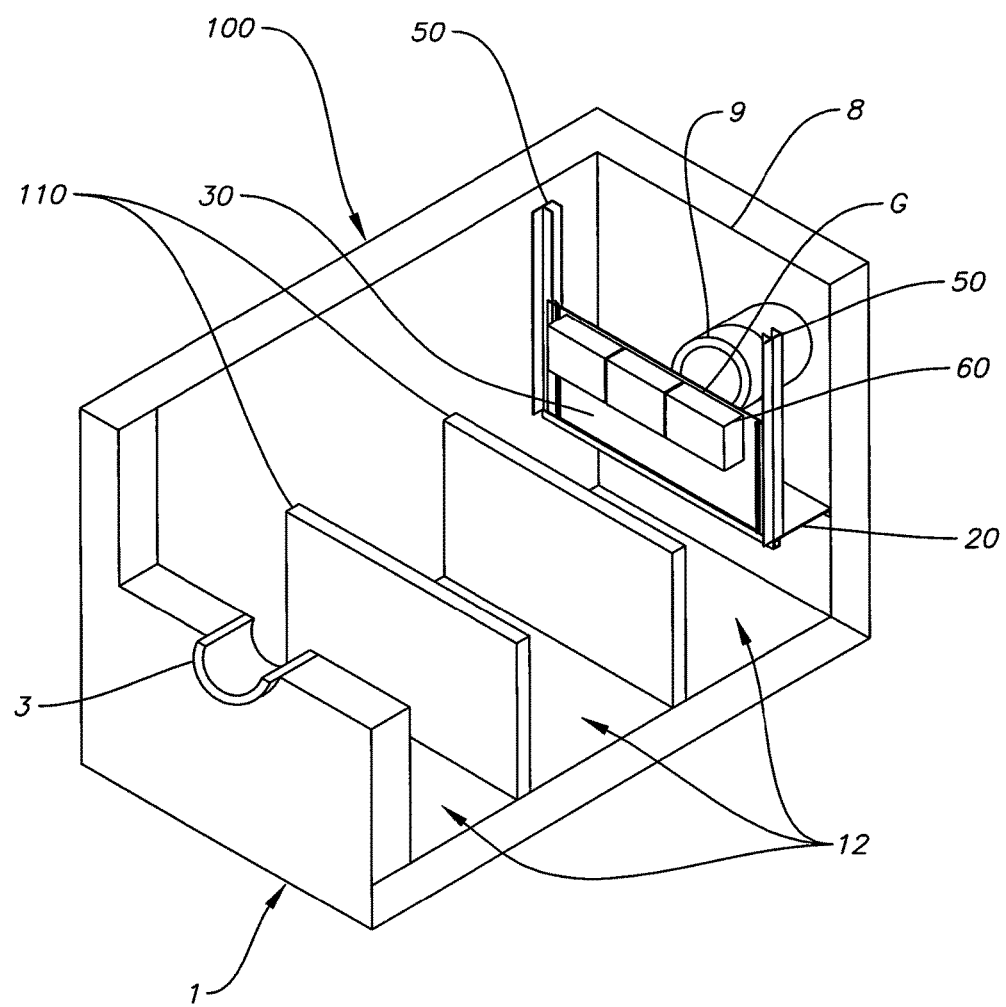

FIG. 14 is a perspective upper view of a multi-chamber vault with track mounted skimmer and float on a shelf, and baffles with no flow.

Figure 15:
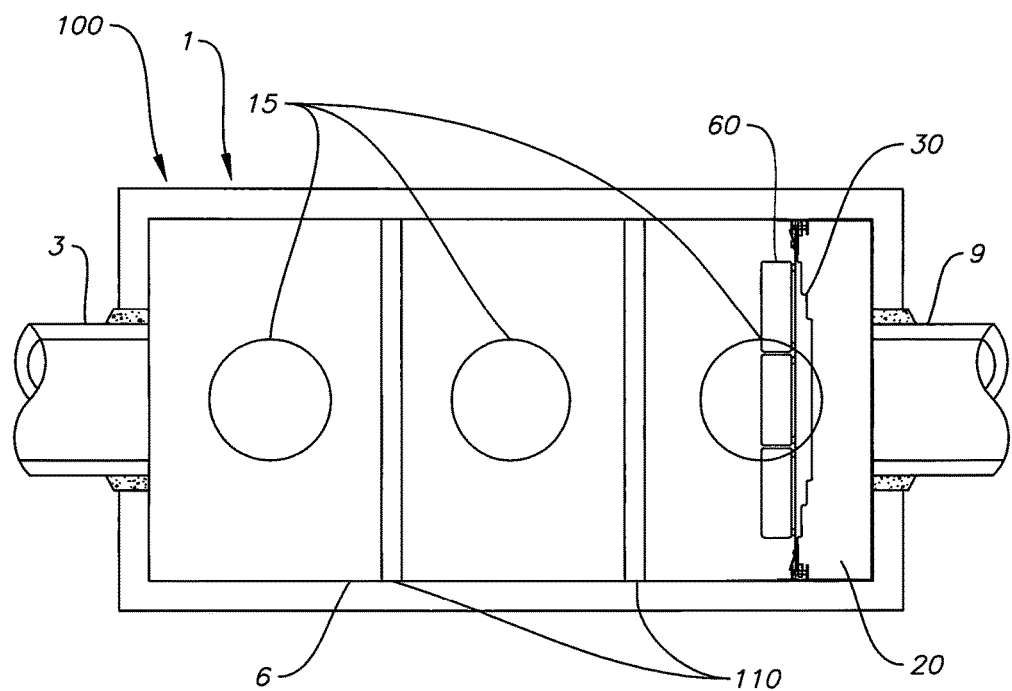

FIG. 15 is a top view of the multi-chamber vault with skimmer and float and baffles of FIG. 14.

Figure 16:
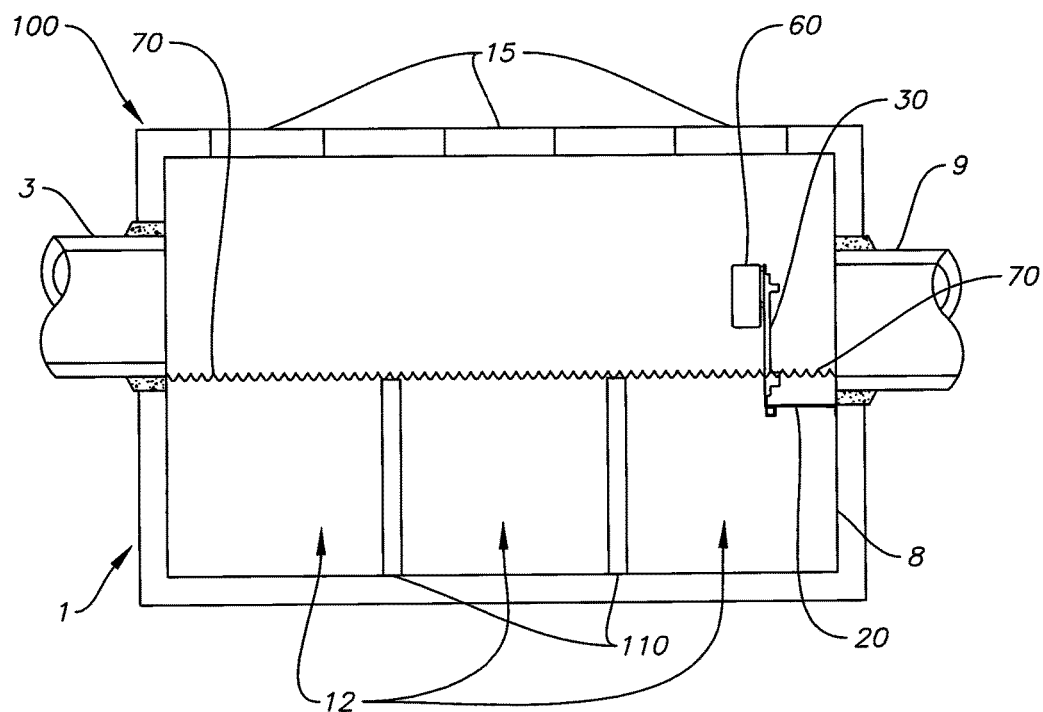

FIG. 16 is a side view of the multi-chamber vault with skimmer and float and baffles of FIG. 14 with side wall removed.

Figure 17:
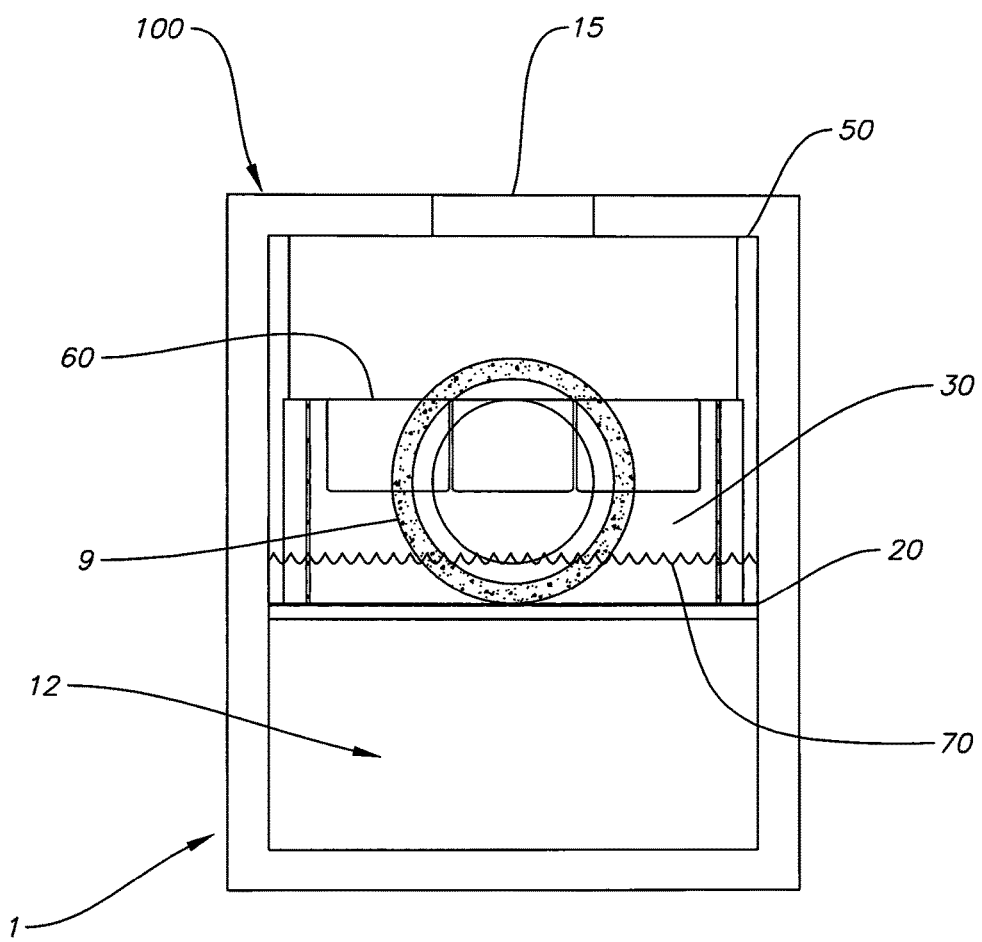

FIG. 17 is an end view from the outflow pipe of the multi-chamber vault with skimmer and float and baffles of FIG. 14 with end wall removed.

Figure 18:
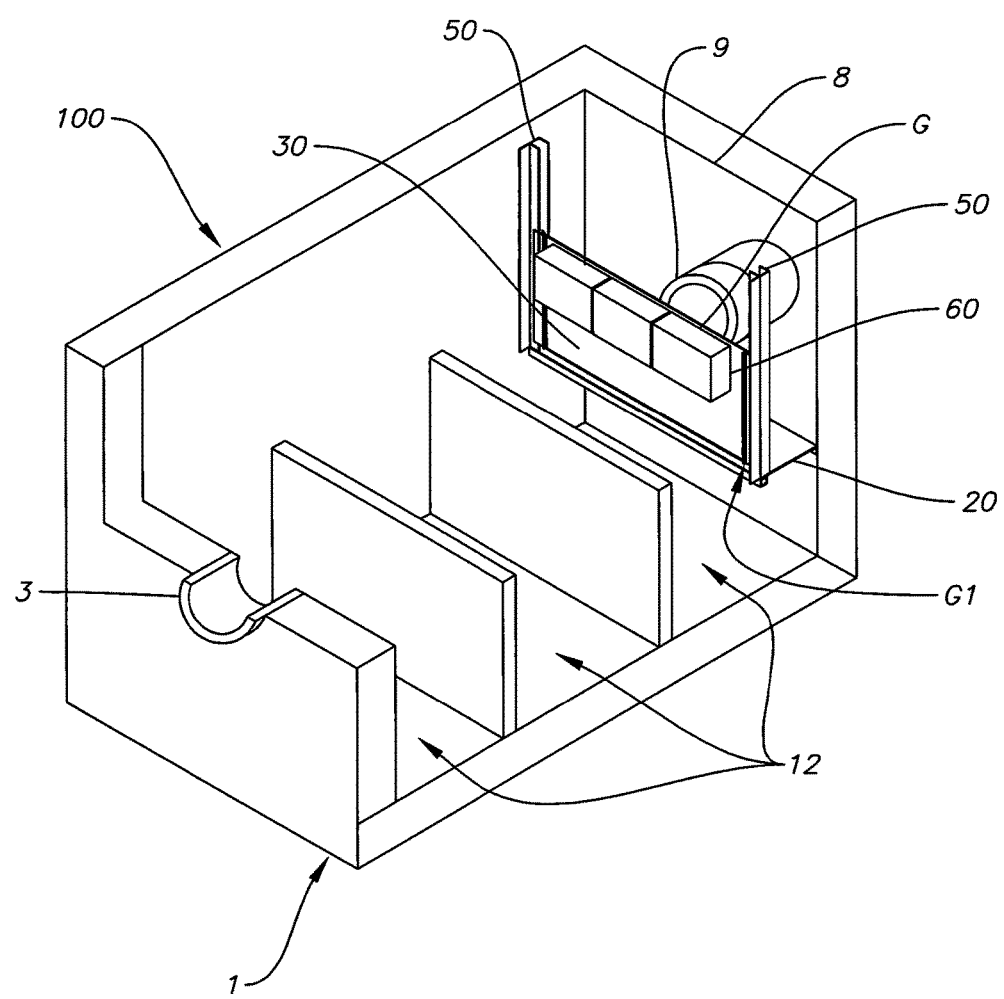

FIG. 18 is another upper perspective view of the multi-chamber vault with skimmer and float and baffles of FIG. 14 during medium flow.

Figure 19:
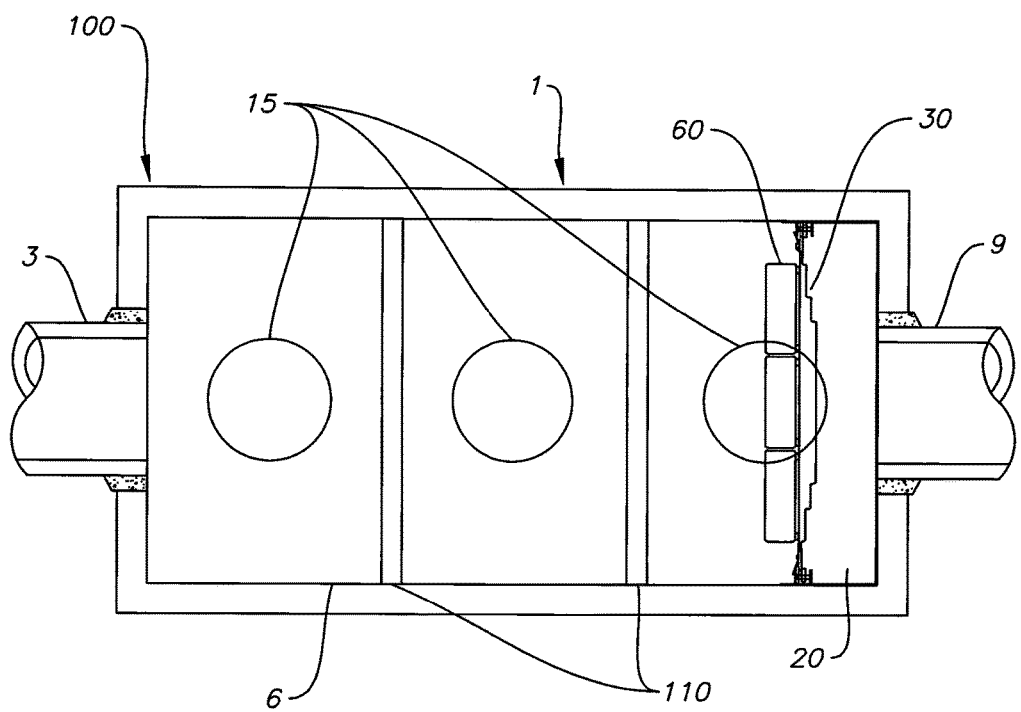

FIG. 19 is a top view of the multi-chamber vault with skimmer and float and baffles of FIG. 18.

Figure 20:
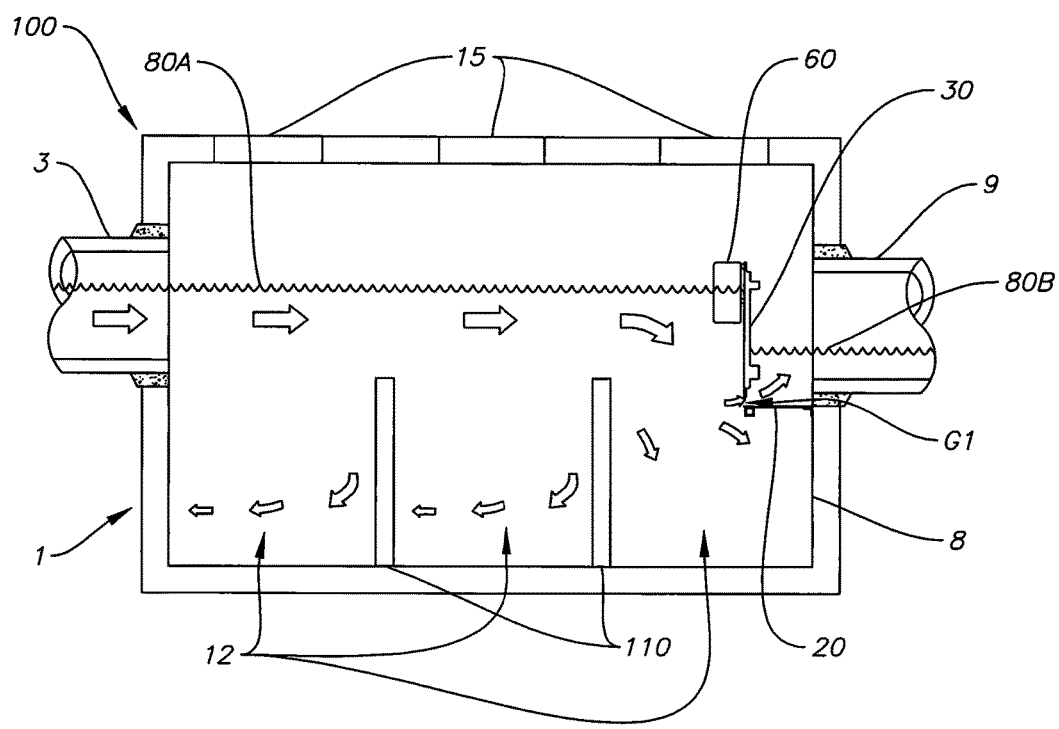

FIG. 20 is a side view of the multi-chamber vault with skimmer and float and baffles of FIG. 18 with side wall removed.

Figure 21:
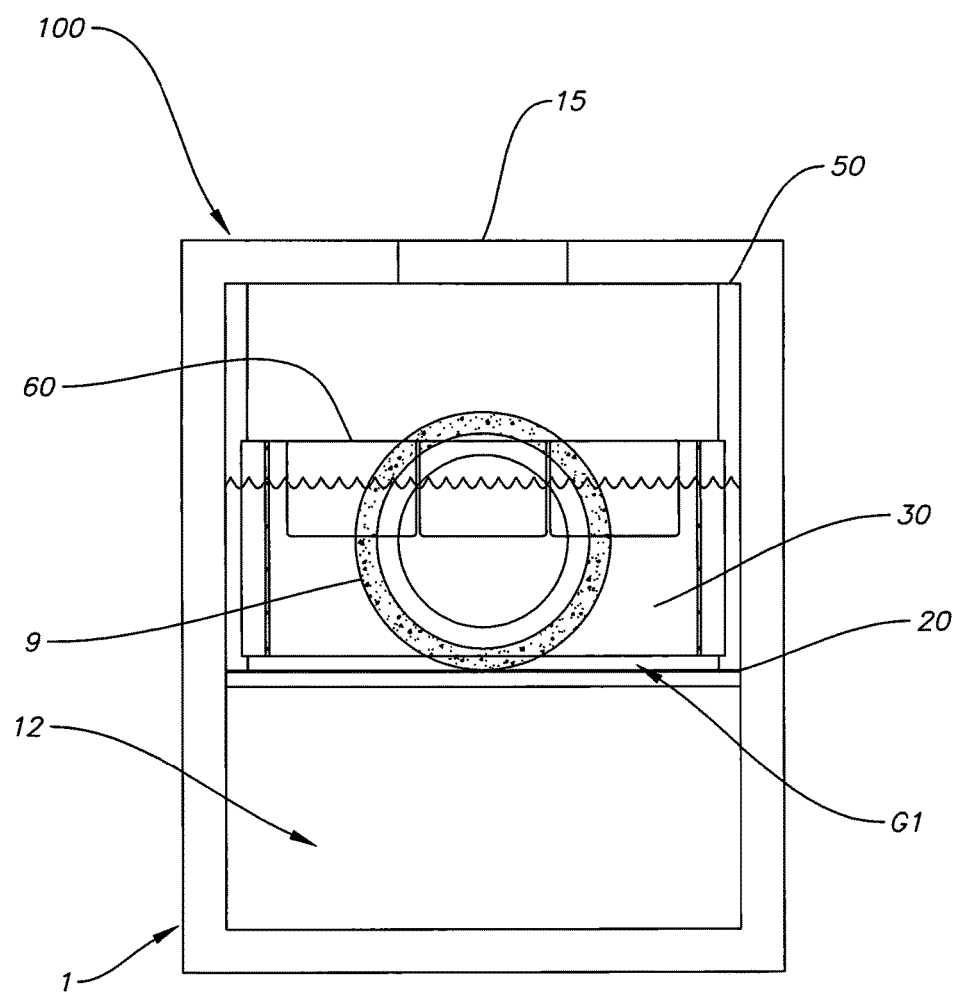

FIG. 21 is an end view from the outflow pipe of the multi-chamber vault with skimmer and float and baffles of FIG. 18 with end wall removed.

Figure 22:
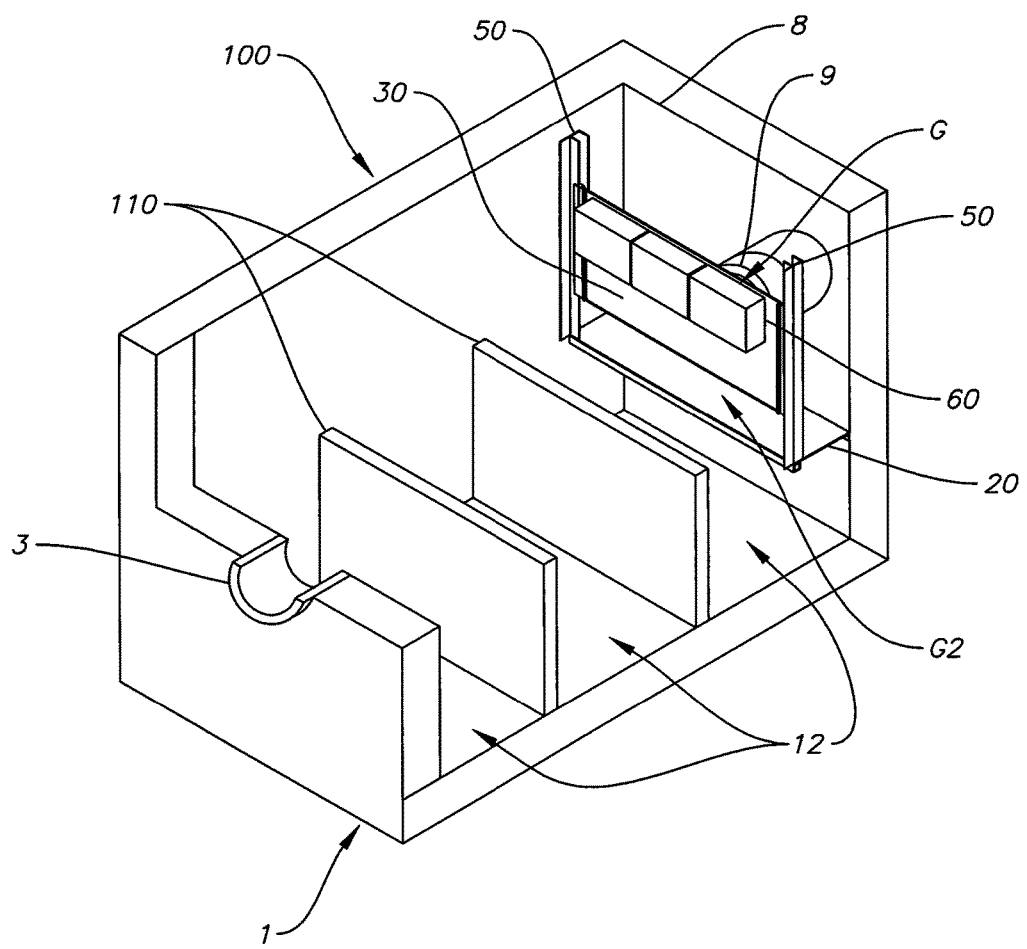

FIG. 22 is another upper perspective view of the multi-chamber vault with skimmer and float and baffles of FIG. 14 during high flow.

Figure 23:
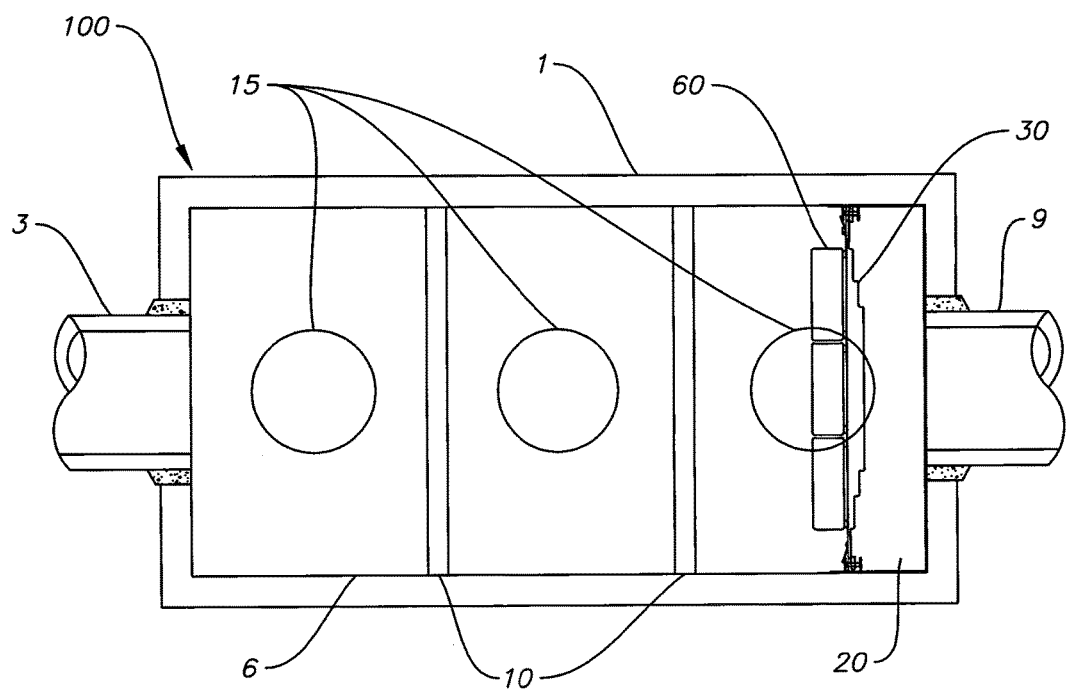

FIG. 23 is a top view of the multi-chamber vault with skimmer and float and baffles of FIG. 22.

Figure 24:
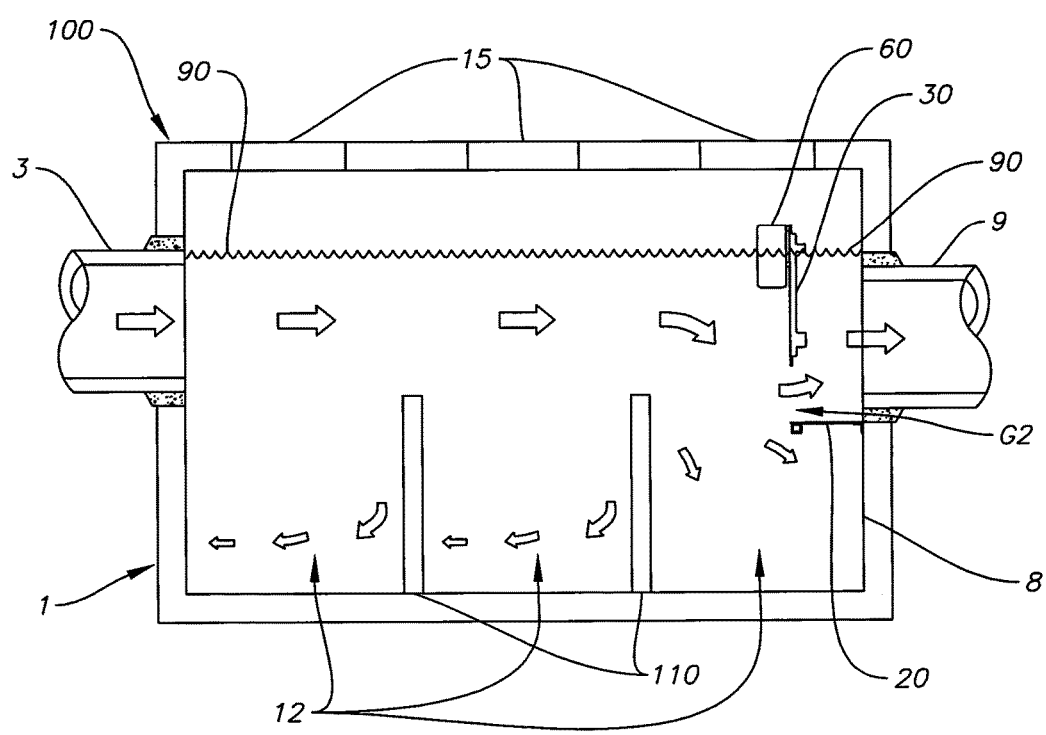

FIG. 24 is a side view of the multi-chamber vault with skimmer and float and baffles of FIG. 22 with side wall removed.

Figure 25:
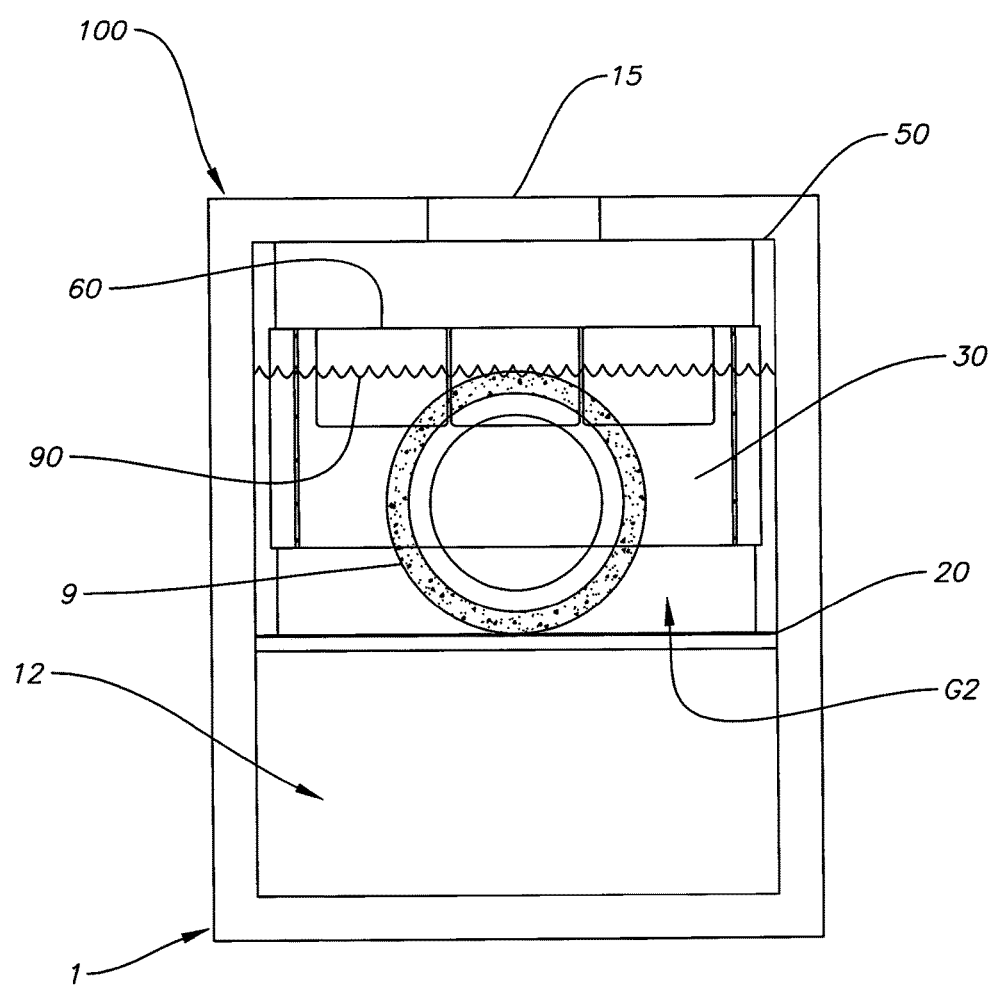

FIG. 25 is an end view from the outflow pipe of the multi-chamber vault with skimmer and float and baffles of FIG. 22 with end wall removed.

Multi-Chamber Vault with Screen System

Figure 26:
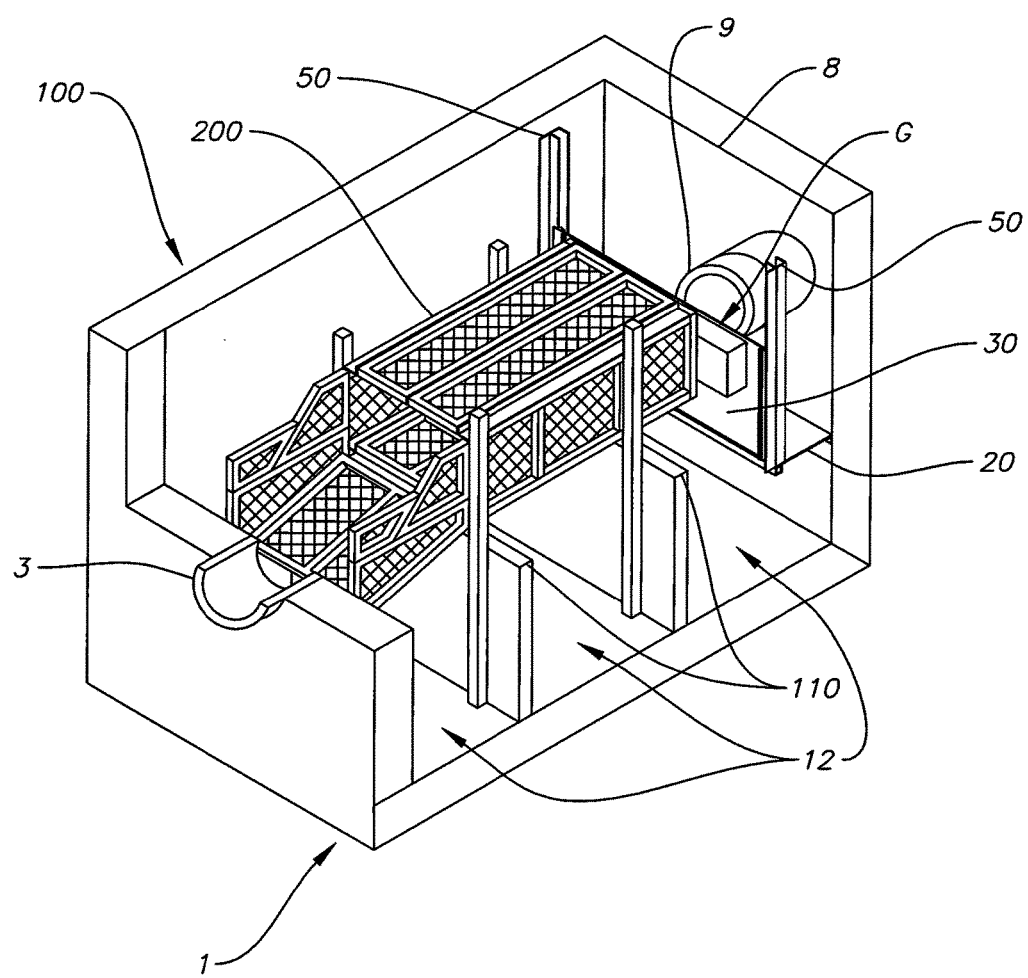

FIG. 26 is a perspective upper view of a multi-chamber vault with track mounted skimmer and float on a shelf, and screen system with no flow.

Figure 27:
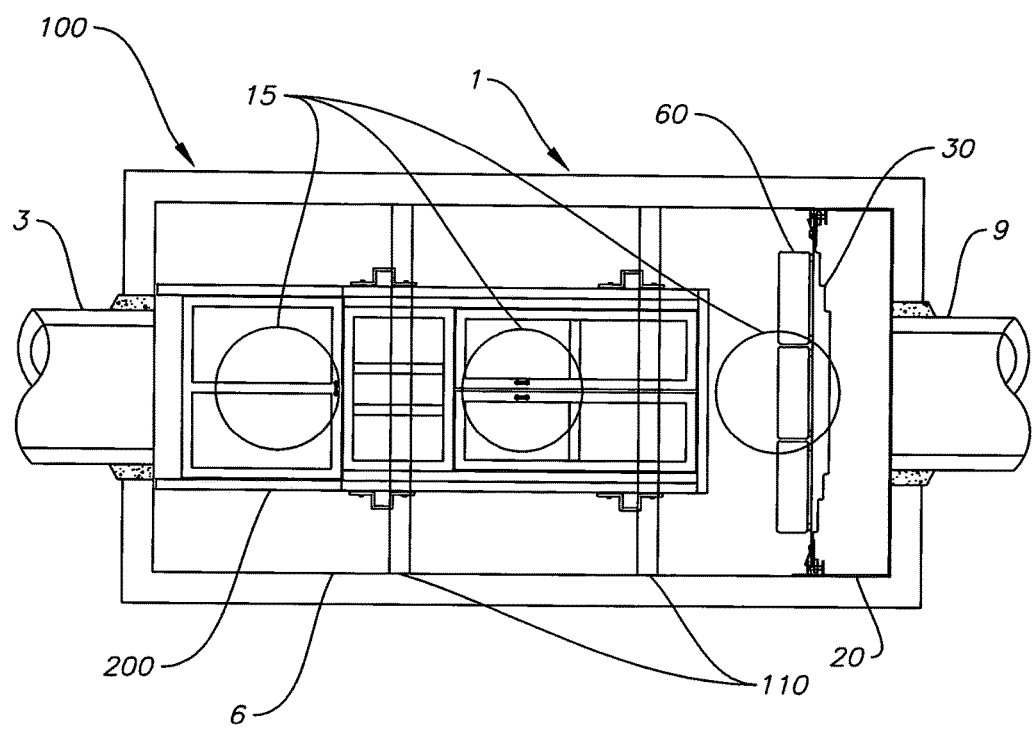

FIG. 27 is a top view of the multi-chamber vault with skimmer and float and screen system of FIG. 26.

Figure 28:
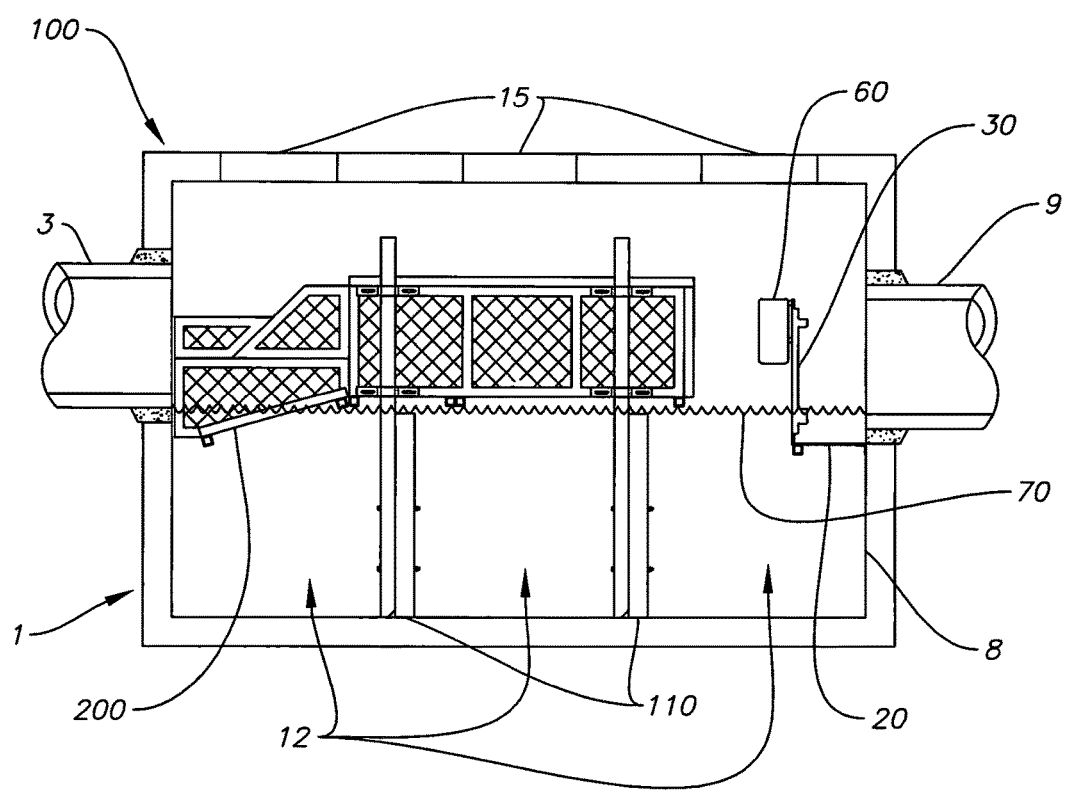

FIG. 28 is a side view of the multi-chamber vault with skimmer and float and screen system of FIG. 26 with side wall removed.

Figure 29:
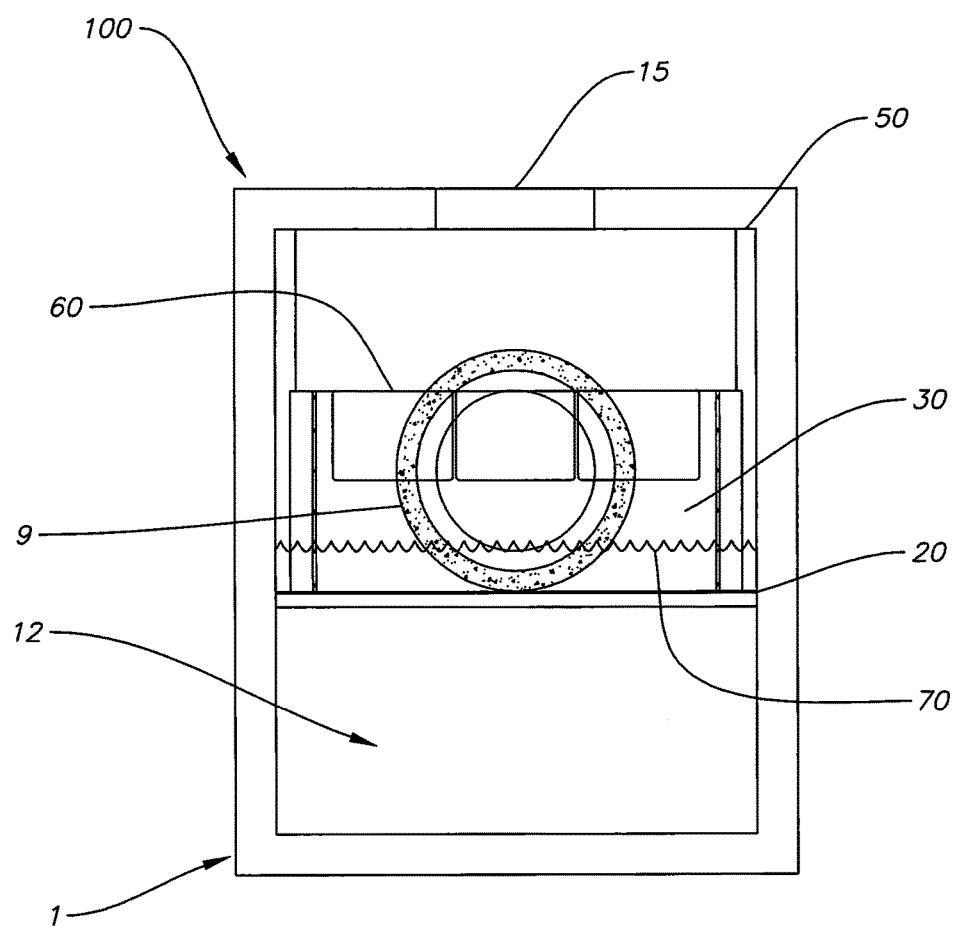

FIG. 29 is an end view from the outflow pipe of the multi-chamber vault with skimmer and float and screen system of FIG. 26 with end wall removed.

Figure 30:
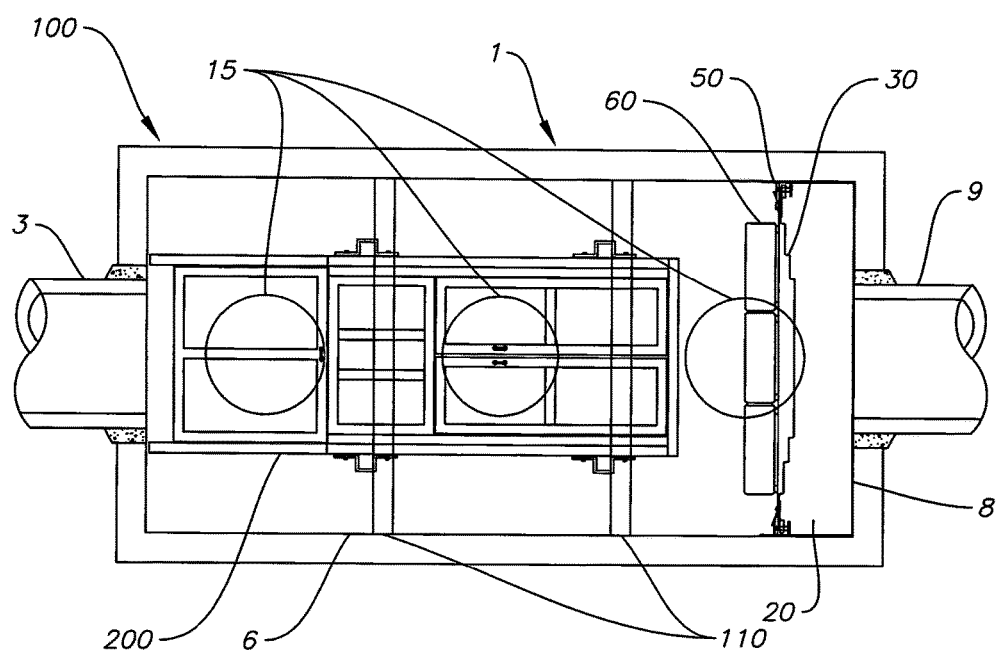

FIG. 30 is a top view of the multi-chamber vault with skimmer and float and screen system of FIG. 26 during medium flow.

Figure 31:
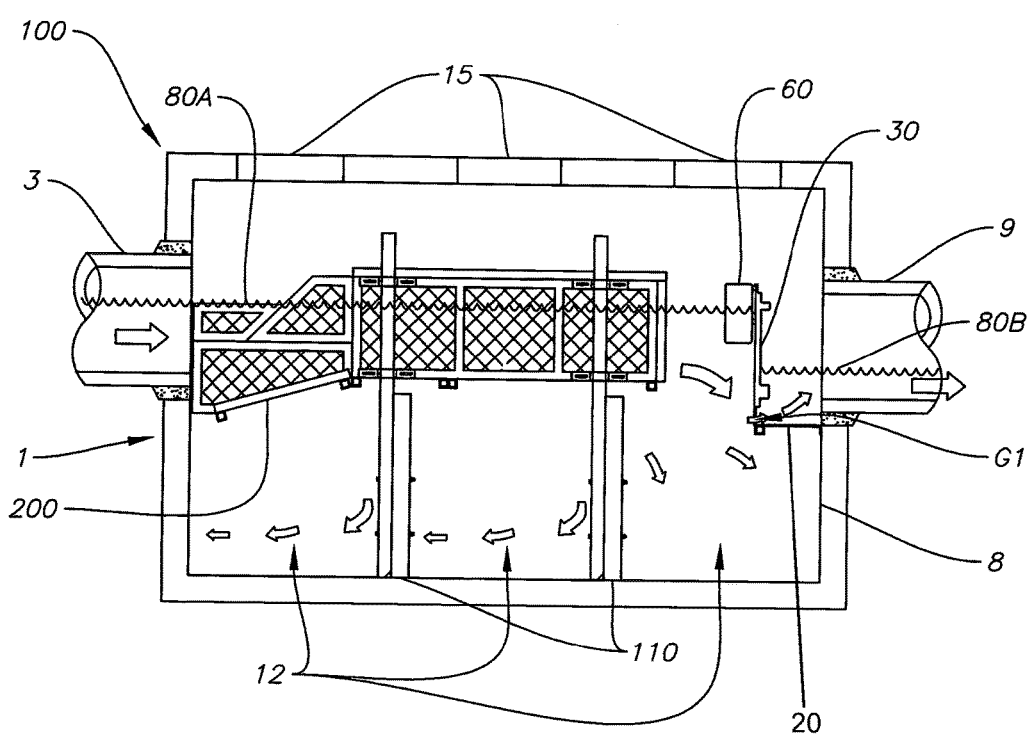

FIG. 31 is a side view of the multi-chamber vault with skimmer and float and screen system of FIG. 30 with side wall removed.

Figure 32:
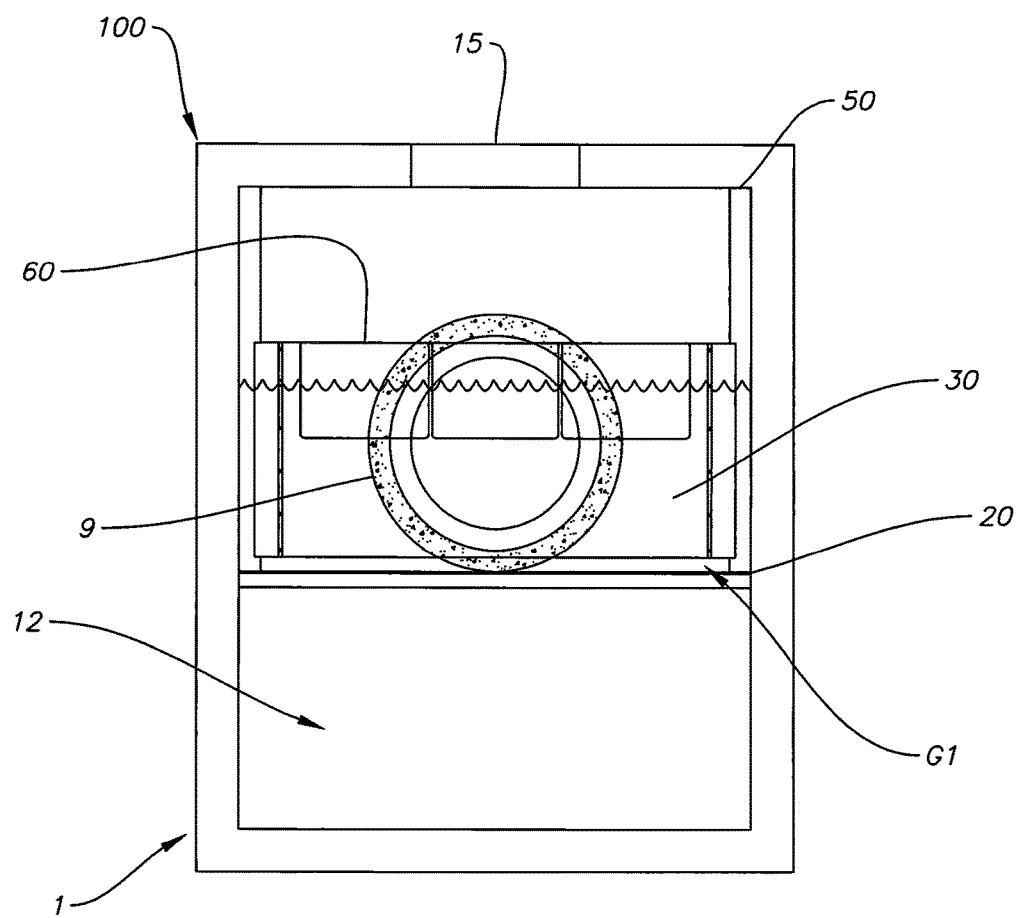

FIG. 32 is an end view from the outflow pipe of the multi-chamber vault with skimmer and float and screen system of FIG. 30 with end wall removed.

Figure 33:
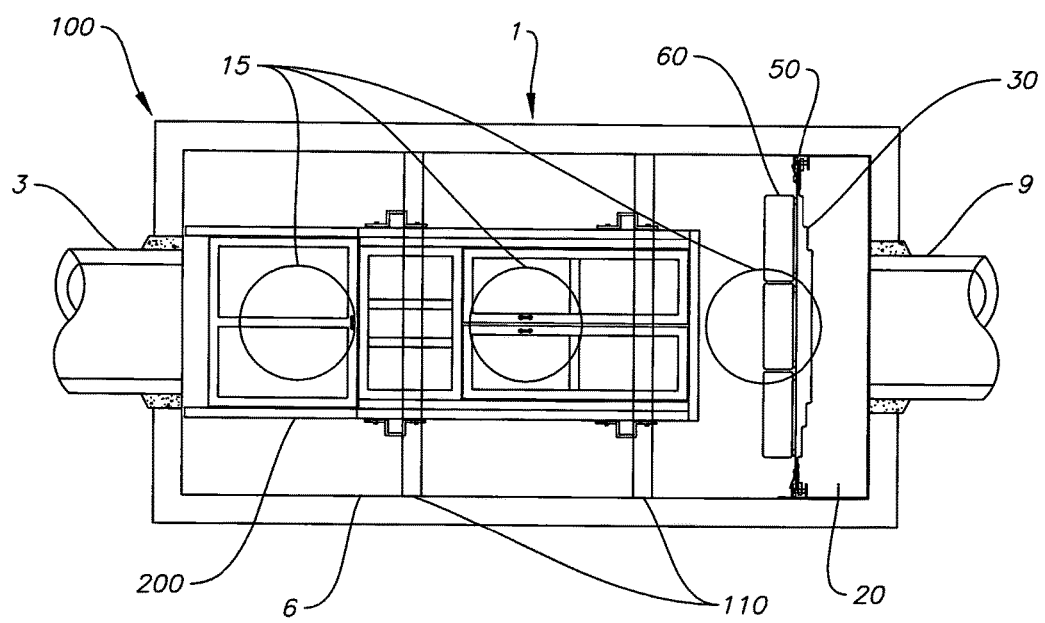

FIG. 33 is a top view of the multi-chamber vault with skimmer and float and screen system of FIG. 26 during high flow.

Figure 34:
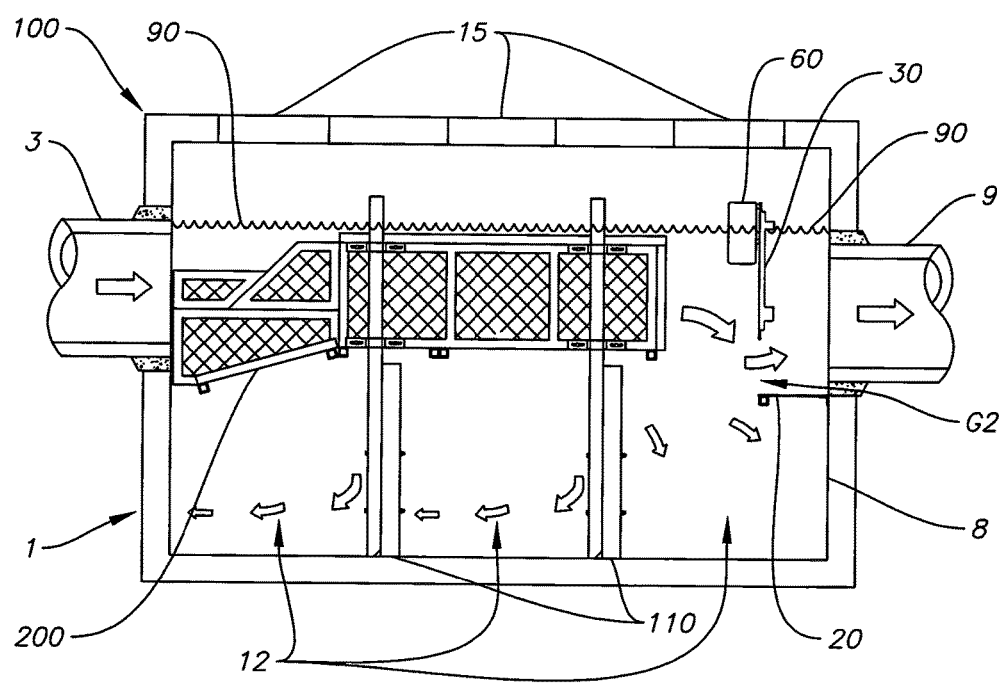

FIG. 34 is a side view of the multi-chamber vault with skimmer and float and screen system of FIG. 33 with side wall removed.

Figure 35:
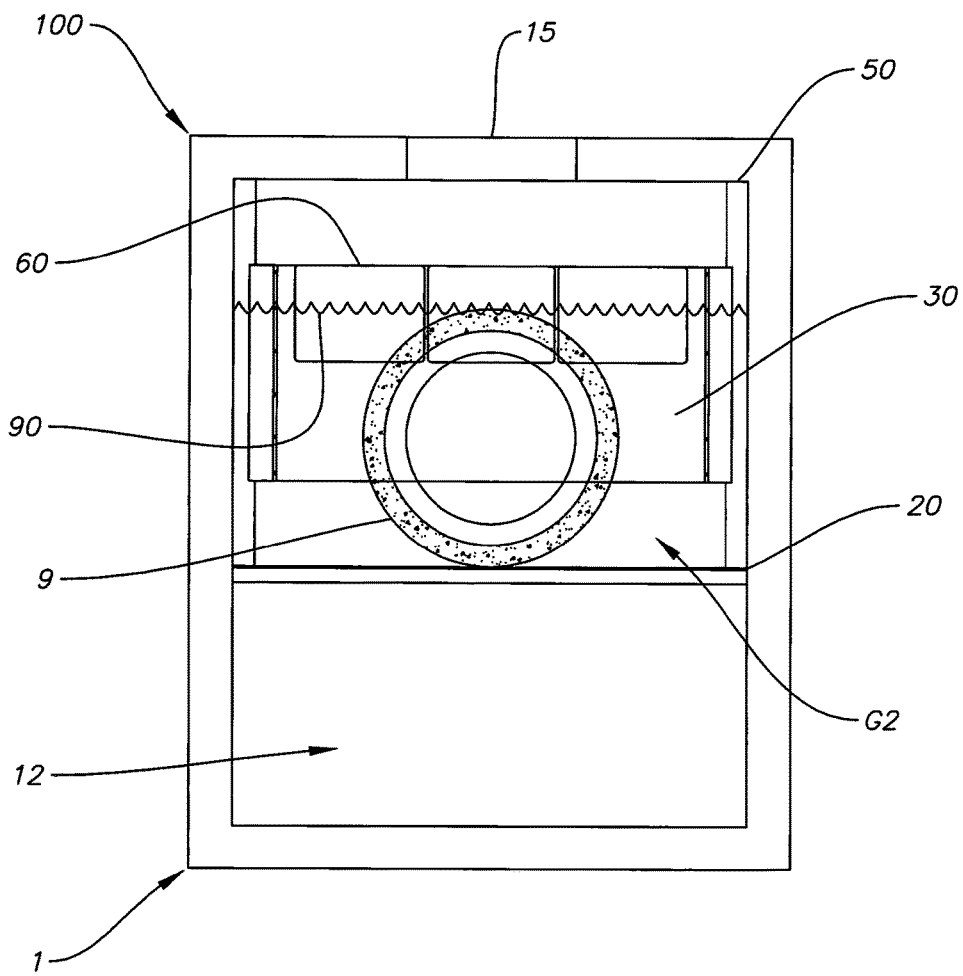

FIG. 35 is an end view from the outflow pipe of the multi-chamber vault with skimmer and float and screen system of FIG. 33 with end wall removed.

Skimmer on Shelf with No Gap

Figures 36, 36A:
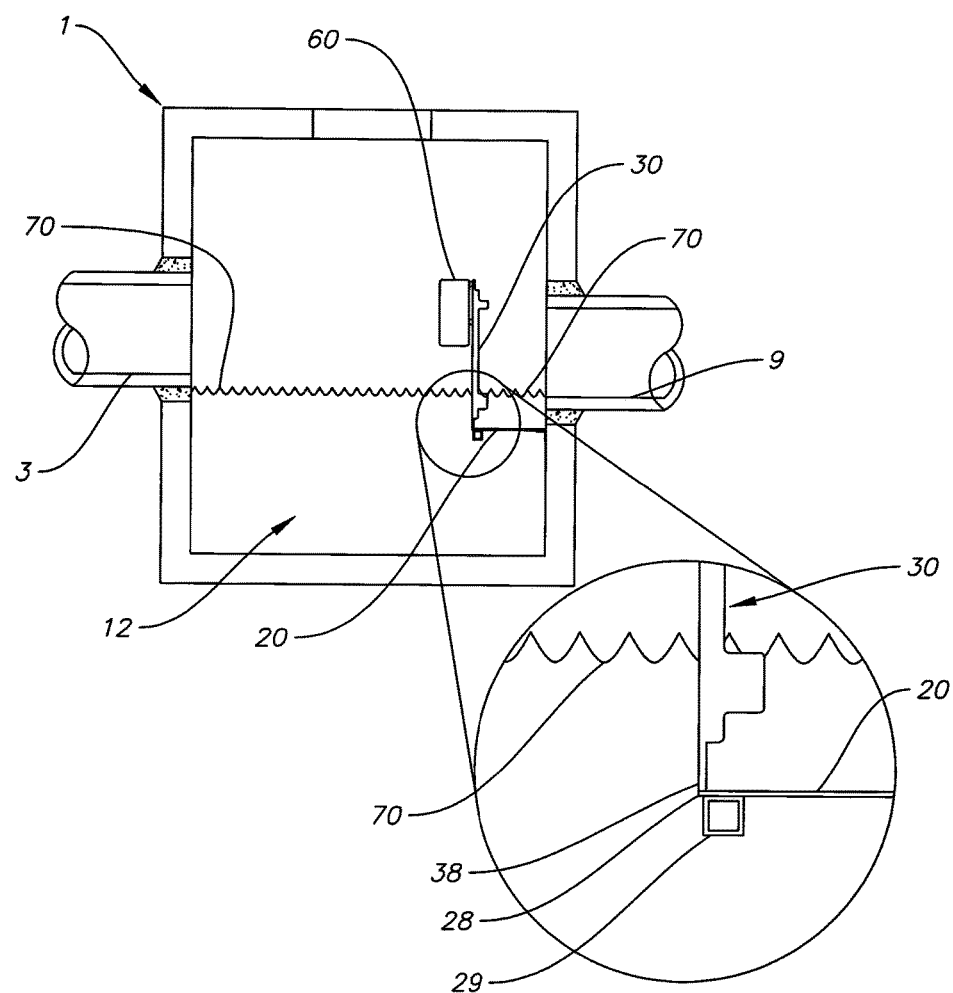

FIG. 36 is a side view of the vault chamber of the preceding figures during no flow of the skimmer and float, with the skimmer sitting on the shelf edge with no gap between the shelf and the skimmer.

FIG. 36A is an enlarged view of the skimmer on shelf with no gap of FIG. 36.

Skimmer Over Top Edge of Shelf with Gap

Figures 37, 37A:
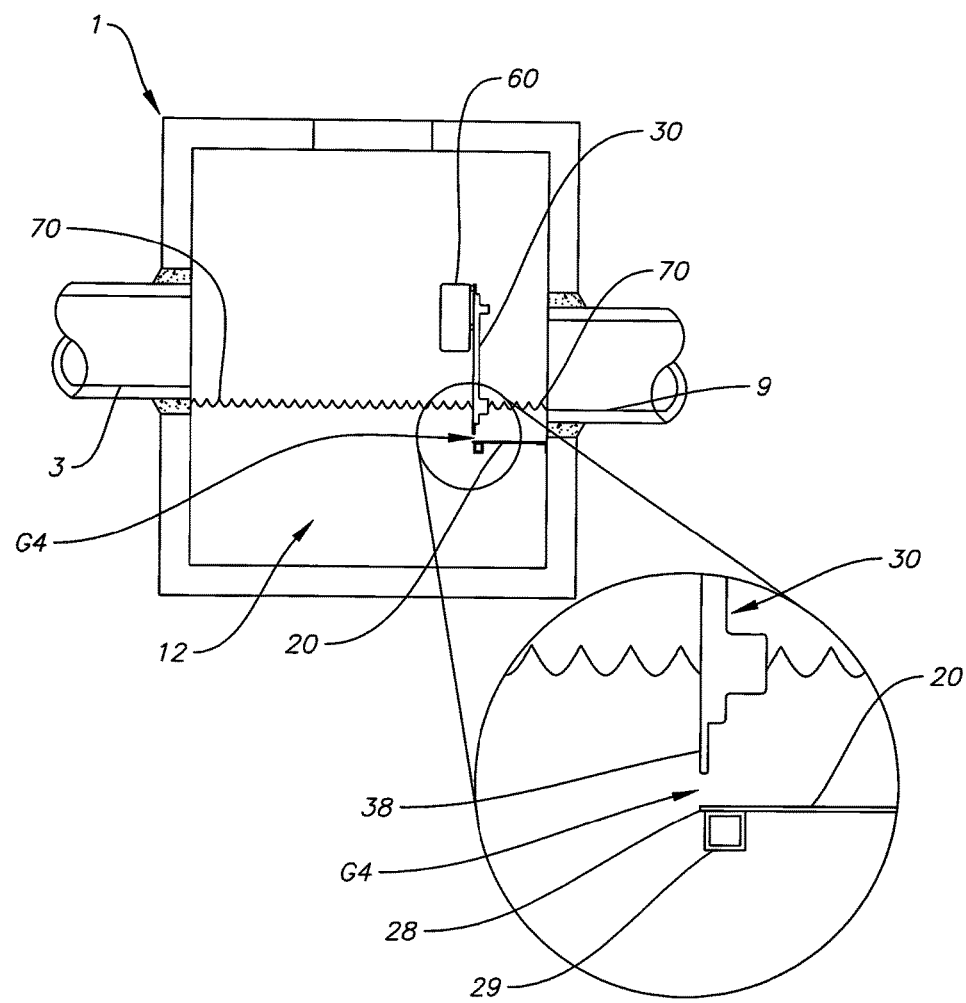

FIG. 37 is a side view of the vault chamber of the preceding figures during no flow of the skimmer and float, with the skimmer over the shelf edge with gap G4 between the top front edge of the shelf and the bottom of the skimmer.

FIG. 37A is an enlarged view of the skimmer over shelf with top gap of FIG. 37.

Skimmer Over Top Edge of Shelf with Gap

Figures 38, 38A:
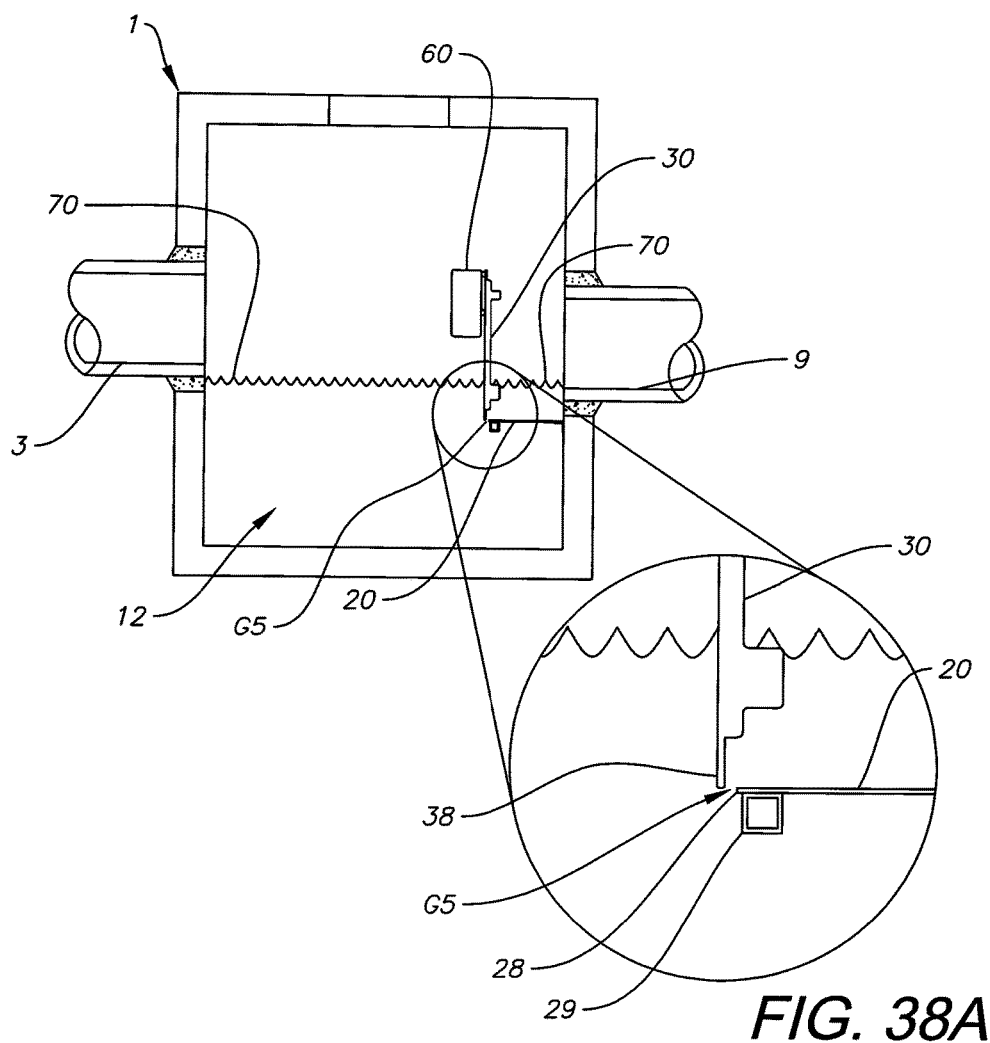

FIG. 38 is a side view of the vault chamber of the preceding figures during no flow of the skimmer and float, with the skimmer in front of the shelf edge with gap between the front of the shelf and the bottom of the skimmer.

FIG. 38A is an enlarged view of the skimmer over shelf with gap between the front of the shelf and the bottom of the skimmer of FIG. 38.

Skimmer Hanging Down in Front of Shelf with Gap

Figures 39, 39A:
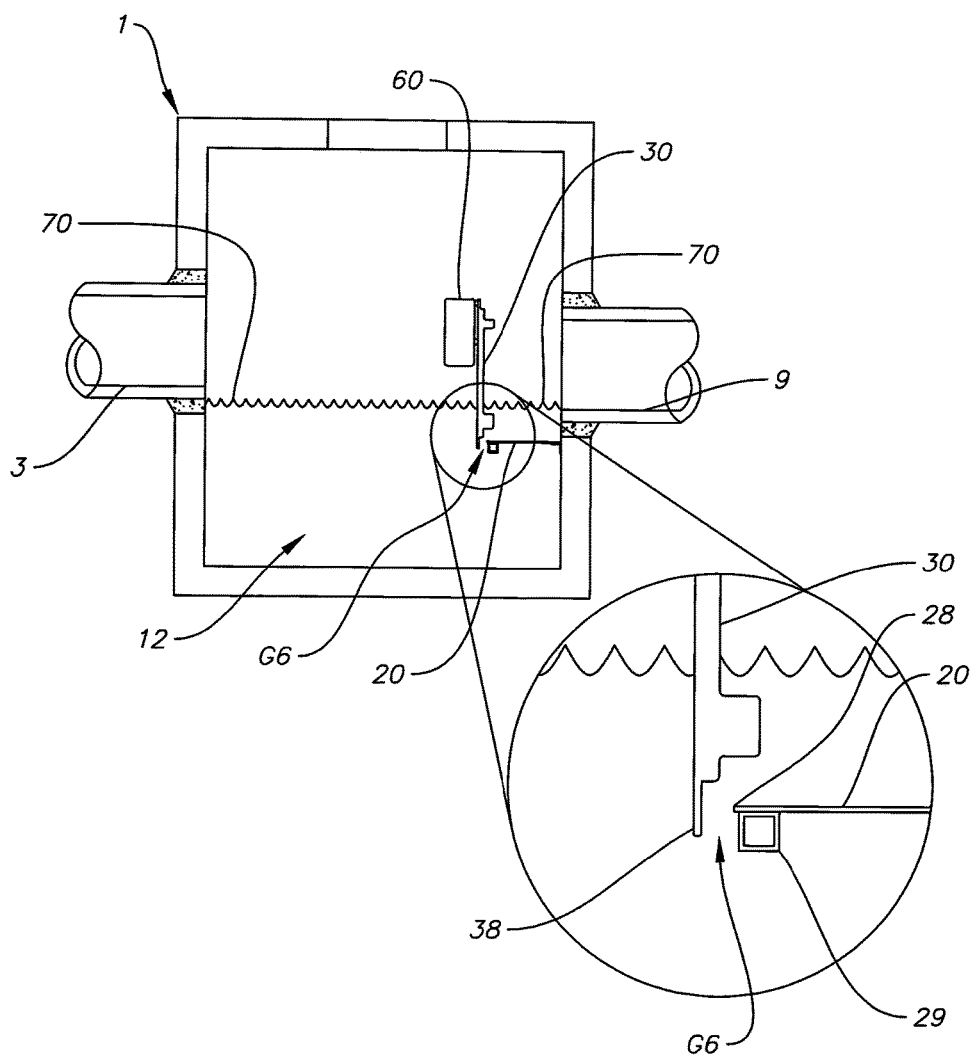

FIG. 39 is a side view of the vault chamber of the preceding figures during no flow of the skimmer and float, with the skimmer hanging down in front of shelf edge with gap between the hanging down front of the shelf and the skimmer.

FIG. 39A is an enlarged view of the hanging down skimmer in front of shelf with gap of FIG. 38.

Skimmer Inside of Outer Edge of Shelf

Figures 40, 40A:
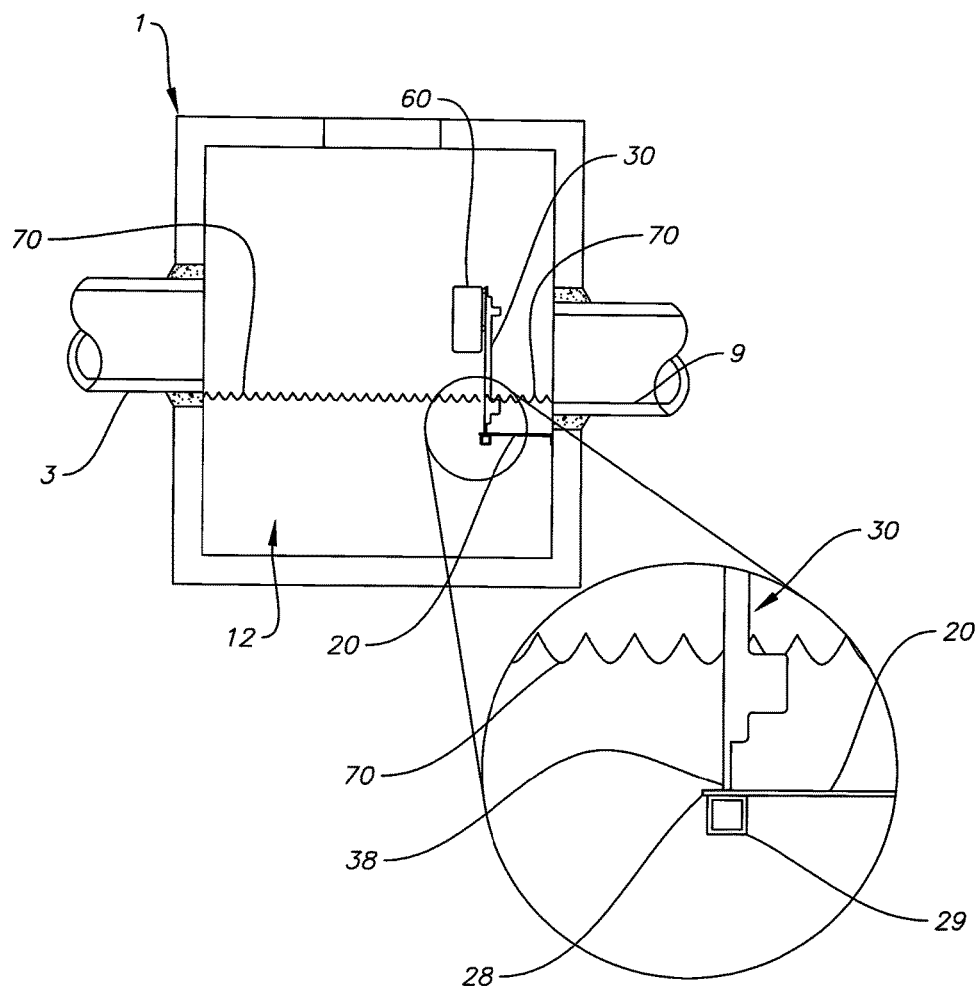

FIG. 40 is a side view of the vault chamber of the preceding figures during no flow of the skimmer and float, with the skimmer bottom located inside the outer edge of the shelf.

FIG. 40A is an enlarged view of the skimmer bottom located on the shelf inside of the outer edge of the shelf.

Figure 41:
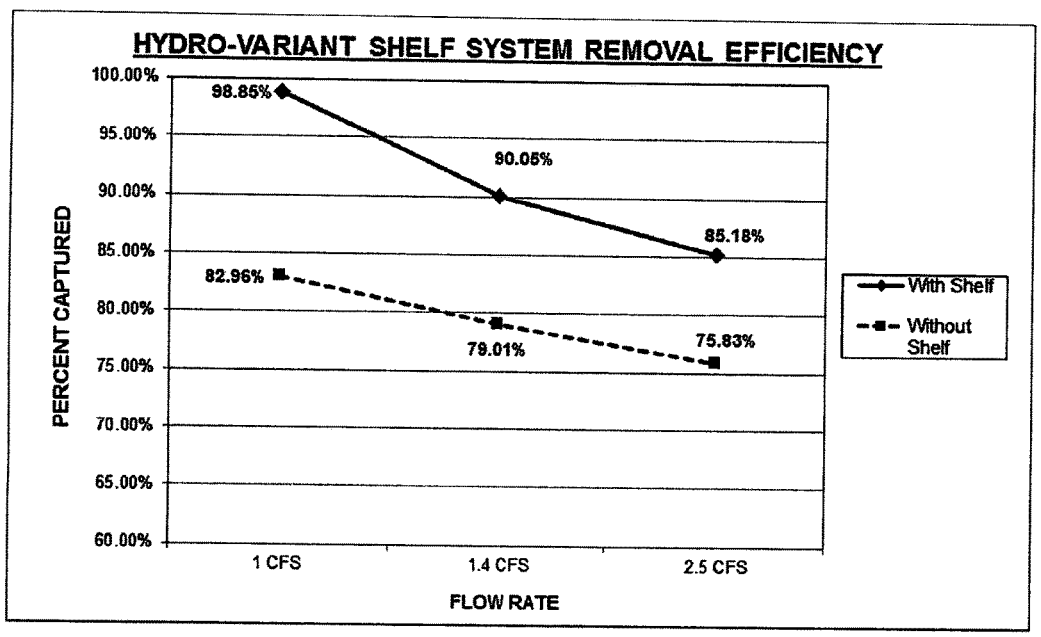

FIG. 41 is a graph show of removal efficiency using the invention as compared to the prior art vaults.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation. In the Summary above and in the Detailed Description of Preferred Embodiments and in the accompanying drawings, reference is made to particular features (including method steps) of the invention.

It is to be understood that the disclosure of the invention in this specification includes all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

A list of components will now be described.

1 Vault with skimmer and float and shelf
2 inlet wall
3 inlet pipe
4. first side wall
6. second side wall
8 outlet wall
9 outflow pipe
10 bottom vault
12 settling chamber
14 top of vault
15 manhole cover(s)
20 shelves (solid)
22 outlet wall side attachment 24 first side wall attachment
26 second side wall attachment
28 outer front edge of shelf
29 support beam for front edge
30 skimmer panel
32 top of skimmer panel
34 first side of skimmer panel
36 second side of skimmer panel
38 bottom of skimmer panel
40 panel wheel assemblies
41 Panel seal
42A top centering wheel
42B. axle for top centering wheel
44A first load wheel
44B axle for first load wheel
45A second load wheel
45B axle for second load wheel
46A third load wheel
46B axle for third load wheel
47A fourth load wheel
47B axle for fourth load wheel
48A bottom centering wheel
48B axle for bottom centering wheel
50 skimmer tracks (channels)
60 float(s)
70 no flow hydraulic gradeline
80A medium flow inflow hydraulic gradeline
80B medium flow outflow hydraulic gradeline
90 high flow hydraulic gradeline
100 Multi-chamber
110 baffles
200 screen system
G gap between float and skimmer panel
G1 gap opening between lower edge of skimmer panel and shelf outer edge during medium flow
G2 gap opening between lower edge of skimmer panel and shelf outer edge during high flow
G4 minimum gap between lower edge of skimmer panel an front edge of shelf
G5 Gap between bottom edge of skimmer panel and front edge of shelf with bottom edge of skimmer panel and shelf at same height
G6 Gap between bottom edge of skimmer panel and front edge of shelf with bottom edge of skimmer panel hanging lower the front edge of shelf The hydro-variant skimmer and shelf system 1 can be adapted to be an internal component of a vault system 1 or an open ditchline. The objective of the invention is to be a skimmer that constricts and restricts stormwater flow during low to medium flows. During high flows the hydraulics of the skimmer will automatically adjust to allow for greater conveyance of water flow. Stormwater treatment systems are generally more effective when more detention time is achieved within the treatment system. Whether the application is for use inside a vault system, open ditchline, pond conveyance, or media application, the greater treatment will be achieved with maximum detention time.

A typical vault system may have a variety of internal components. However, the vault system is always an inflow conveyance and an outflow conveyance. When used in a vault system the invention can be located adjacent to the outflow of the vault. The objective of the invention will be to create greater detention time within the vault. Greater detention time within a vault treatment system will achieve the following:

1. A higher hydraulic grade line within the vault will be achieved with greater detention time. This higher hydraulic grade line will influence the hydraulic grade line within the inflow pipe. This higher hydraulic gradeline in the inflow pipe will increase the cross-sectional conveyance of water flow. When the cross-sectional conveyance is increased and the volume of water flow remains the same, the linear velocity of water flow will reduce. Reduced linear velocity in the pipe will enable greater stratification of heavier that water solids within the pipe toward the bottom of the pipe. When heavier the water solids are conveyed along the bottom of a pipe, the distance that the solids must travel through the water column in the treatment vault to reach the settling zone of the treatment vault is reduced. This will enhance the potential capture of heavier than water solids within the treatment vault.

2. Comparing a low hydraulic grade line in a pipe to that of a high hydraulic grade line in a pipe, with both conditions having the same volume of flow. The linear velocity of water flow in the condition with the low hydraulic gradeline will have a significantly higher linear velocity than that of the condition having the high hydraulic gradeline. The general shape of a pipe (round) has significantly greater cross-sectional conveyance midway up the pipe as compared to the cross-sectional conveyance at the bottom of a pipe. For example; For an approximately 24" diameter pipe, the cross-sectional conveyance from the bottom to 3" up is 0.23 ft$^2$, the cross-sectional conveyance 3" tall midway in the pipe is 0.5 ft$^2$. The cross-sectional conveyance vertically midway in a pipe is greater than double that of the conveyance along the bottom of the pipe. Being able to take advantage of the cross-sectional conveyance midway in a pipe will dramatically reduce the linear velocity of the water flowing through the pipe. It is typical for treatment systems that settle heavier than water solids into lower settling chambers to function better when the linear velocity of water is reduced. Reduced linear inflow velocity will prevent inertia of water flow from streaming through a treatment system and bypassing the features of the treatment system. Lower linear velocity of inflow water will also help to avoid the re-suspension of heavier than water solids.

Single Chamber/Vault

Figure 1:
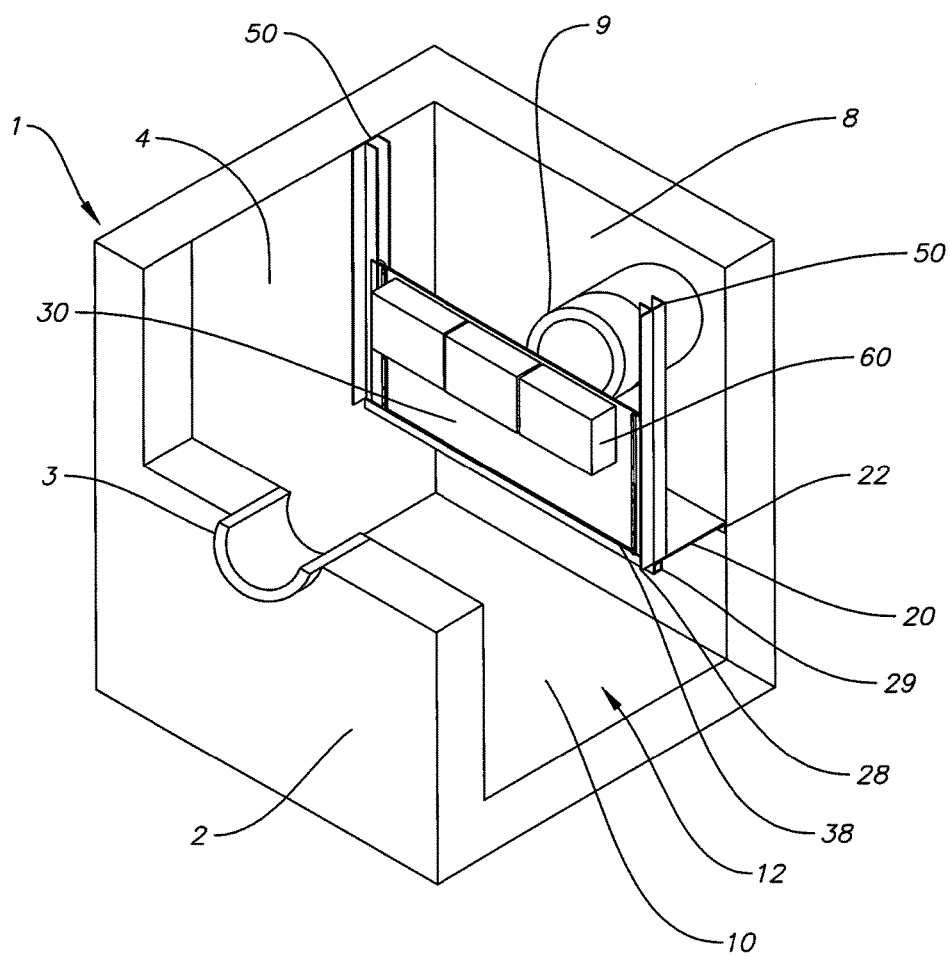
FIG. 1 is an upper perspective partial cut-away view of a single chamber or rectangular vault with track mounted skimmer with float on a shelf with no flow.

FIG. 1 is an upper perspective partial cut-away view of a single chamber or rectangular vault 1 generally formed from concrete, and the like, with a track mounted skimmer panel 30 with float 60 on a shelf 20 with no flow.

Figure 2A:
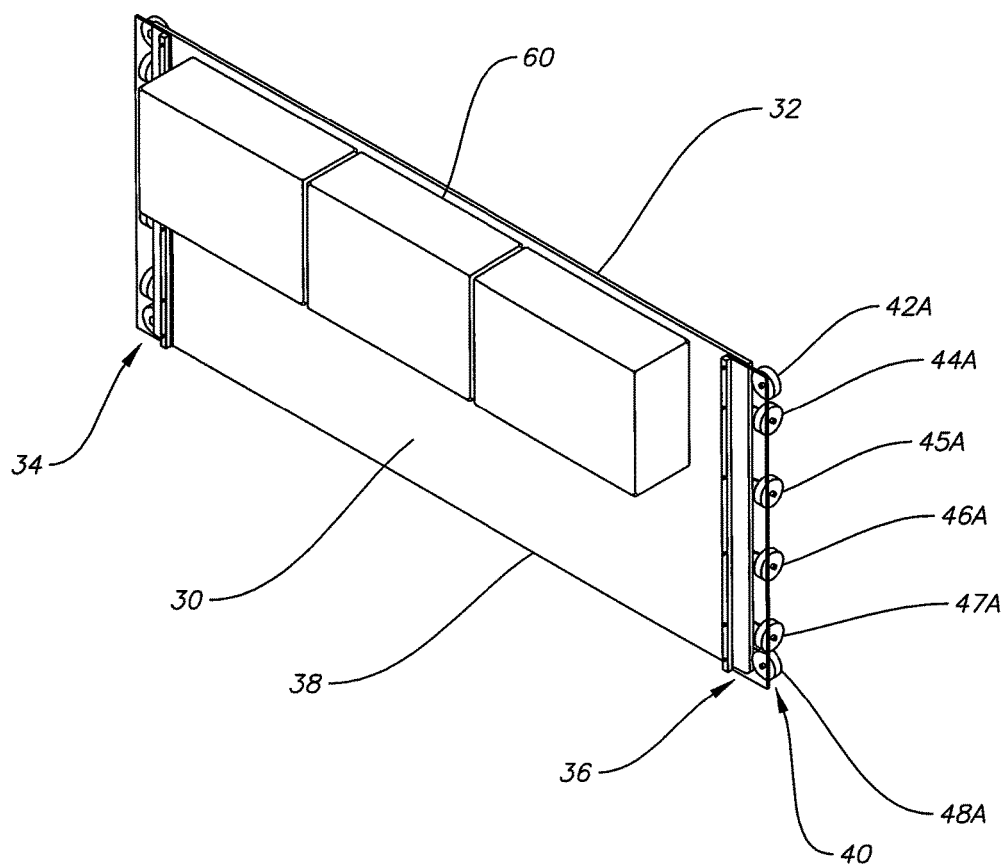
FIG. 2A is an enlarged front perspective view of the skimmer with float of FIG. 1.
Figure 2E:
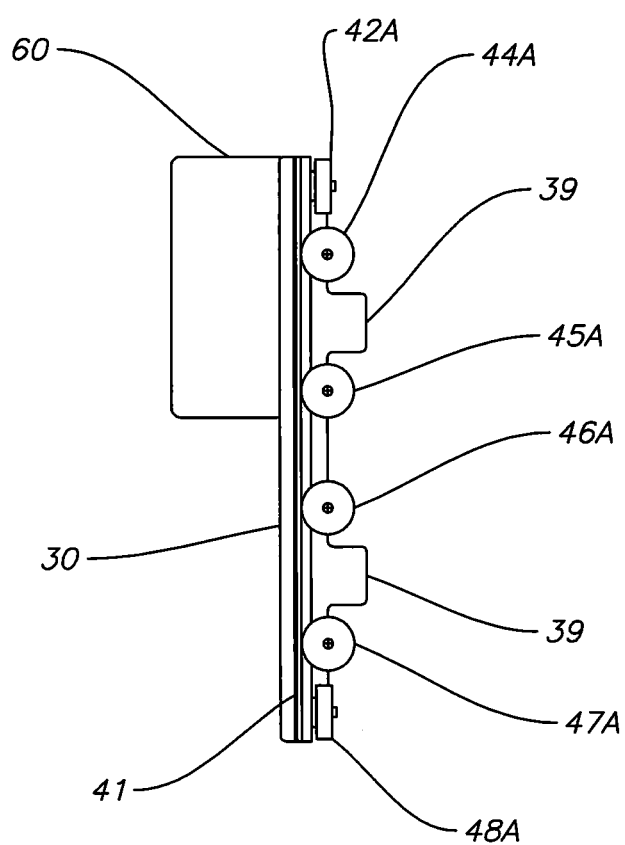
FIG. 2E is a left side view of the skimmer with float of FIG. 2B.

FIG. 2A is an enlarged front perspective view of the skimmer 30 with float 60 of FIG. 1. FIG. 2B is a rear perspective view of the skimmer 30 with float 60 of FIG. 2A FIG. 2C is an enlarged view of the lower left corner of the skimmer 30 of FIG. 2B. FIG. 2D is an enlarged view of the lower right corner of the skimmer 60 of FIG. 2B FIG. 2E is a left side view of the skimmer 30 with float 60 of FIG. 2B.

Figure 3:
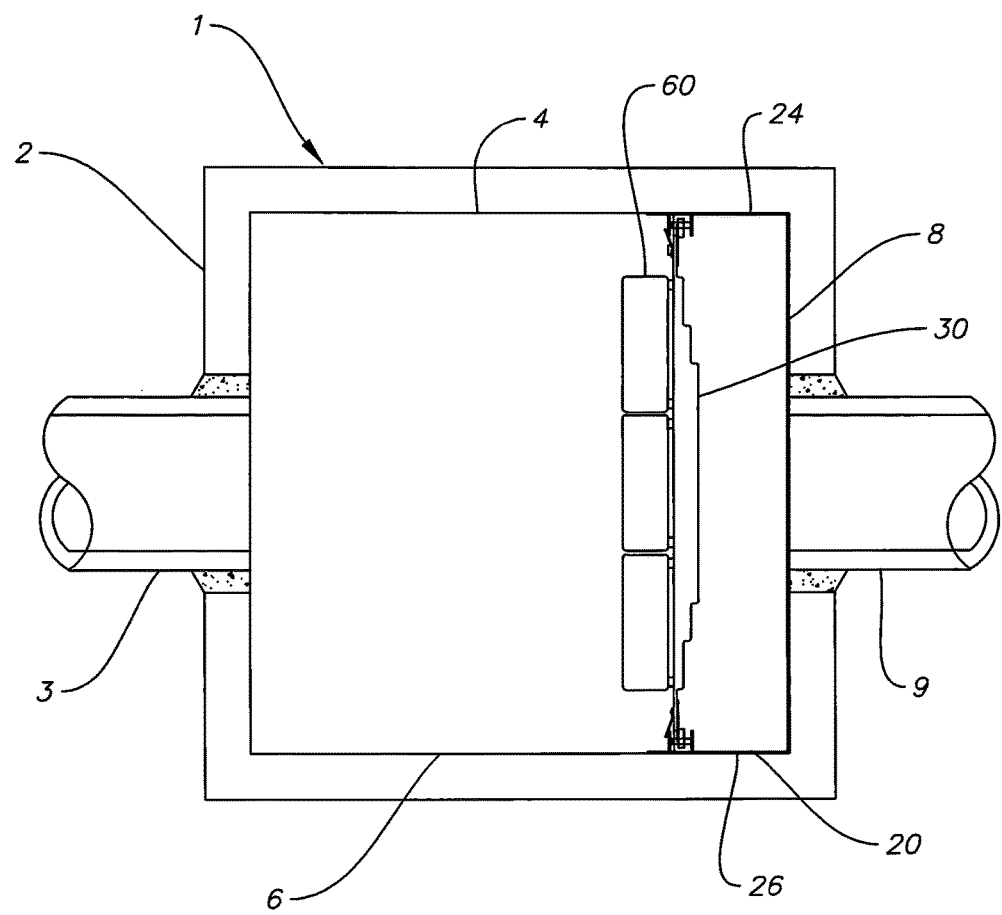
FIG. 3 is a top view of the chamber/vault with skimmer and float of FIG. 1.
Figure 4:
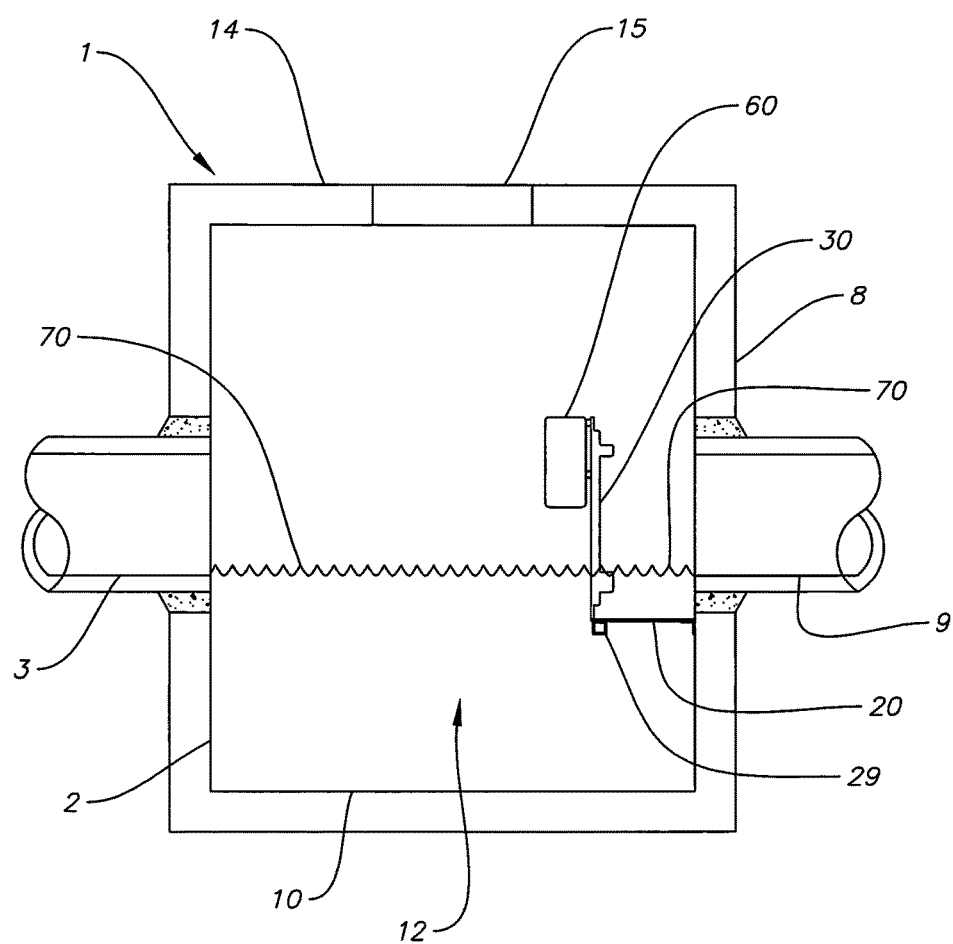
FIG. 4 is a side view of the chamber/vault with skimmer and float of FIG. 1 with side wall removed.
Figure 5:
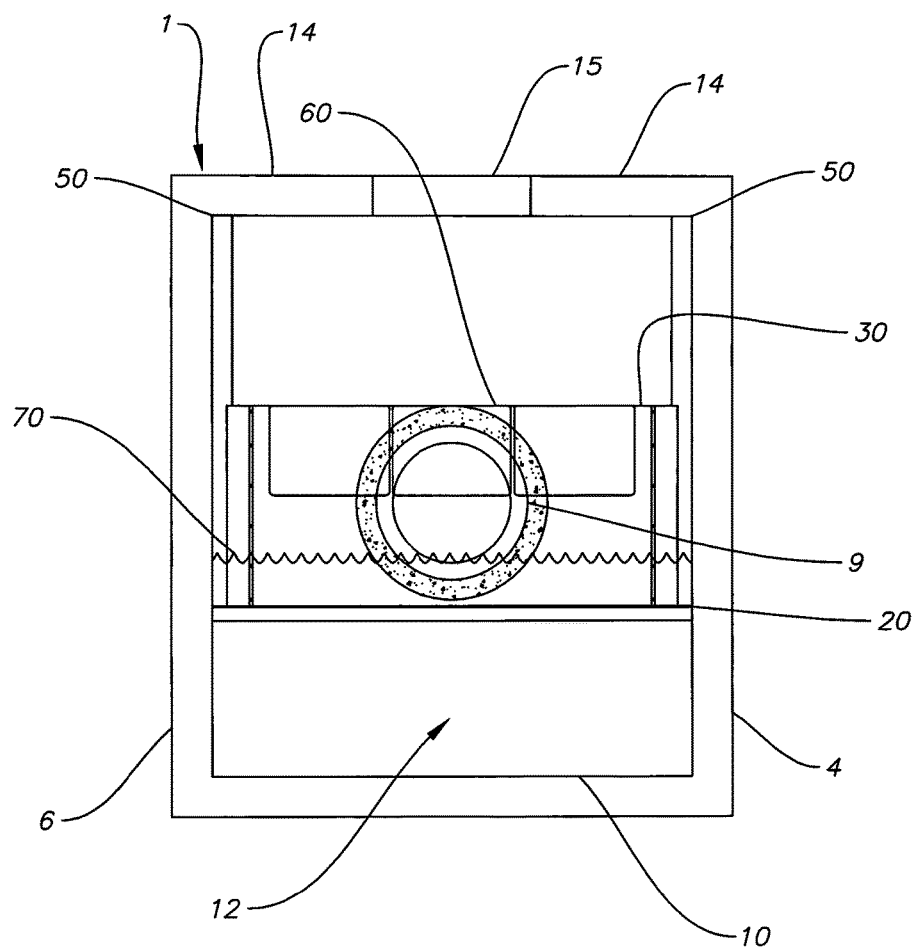
FIG. 5 is an end view from the outflow pipe view of the chamber/vault with skimmer and float of FIG. 1 with end wall removed.

FIG. 3 is a top view of the chamber/vault 1 with skimmer panel 30 with float 60 and shelf 20 of FIG. 1. FIG. 4 is a side view of the chamber/vault 1 with panel 30 with float 60 and shelf 20 of FIG. 1 with side wall removed. FIG. 5 is an end view from the outflow pipe 9 of the chamber/vault 1 with skimmer panel 30 with float 60 and shelf 20 of FIG. 1 with end wall 8 removed.

Referring to FIGS. 1-5 a single chamber square or rectangular vault 1 is shown that can have an inlet wall 2 with inlet pipe 3, first side wall 4, second side wall 6, outlet wall 8, outflow pipe 9, bottom wall 10, settling chamber 12, top of vault 14 with manhole cover(s) 15.

With the no flow 70 scenario the hydraulic gradeline is at a low level in the chamber 1 with the flow level slightly lower than the bottom of the inlet pipe 3.

A generally horizontal shelf 20 can have a rear edge that can be attached to the outlet wall attachment 22 to the outlet wall, first side wall attachment 24 attached to a first side wall 4, second side wall attachment 26 attached to a second side wall 6, and a horizontal support beam 29 which has ends attached to each of the side walls 4, 6 which supports the outer front edge 28 of the shelf 20. The front edge 28 of the shelf 20 can also be inclined approximately 20% down from the rear outlet wall attachment 22.

Referring to FIGS. 2A-2E, the floatable skimmer panel 30 can be a generally planar panel formed from solid metal, plastic, combinations thereof, and the like, such as those described in U.S. Pat. Nos. 7,846,327; 8,034,234; 8,034,236; 8,083,937; and 8,231,780, each to Happel, the inventor of the subject invention, which are all incorporated by reference in their entirety.

The wheel assemblies 40 used with the floatable skimmer panel 30 can be similar wheel assemblies shown and described in U.S. Pat. Nos. 8,034,234; 8,034,236; 8,083,937; and U.S. Pat. No. 8,231,780 to Happel, the inventor of the subject invention, which are all incorporated by reference in their entirety.

The skimmer panel 30 can have a top edge 32, first side extending flange 34, second side extending flange 36, bottom edge 36, and wheel assemblies 40 attached to both the first side flange 34 and second side flange 36. Each of the wheel assemblies can include a seal 41 which provides a water proof seal against side water passing about the skimmer panel 30, when water is pushing against an opposite side of the panel 30.

Each of the wheel assemblies 40, can include a top centering wheel 42A, axle 42B for top wheel 42A which rotates in a plane parallel to the plane of the panel 30, a first load wheel 44A with axle 44B mounting the wheel 44A in a rotational plane perpendicular to the plane of the panel 30, a second load wheel 45A with axle 45B mounting the wheel 45A in a rotational plane perpendicular to the plane of the panel 30, a third load wheel 46A with axle 46B mounting the wheel 46A in a rotational plane perpendicular to the plane of the panel 30, a fourth load wheel 47A with axle 47B mounting the wheel 47A in a rotational plane perpendicular to the plane of the panel 30, and a bottom centering wheel 48A, with axle 48B for the bottom wheel 48A which rotates in a plane parallel to the plane of the panel 30

Each of the wheel assemblies 40 can be attached to the side edges 34, 36 of the panel 30 allows for the panel 30 to slide up and down in each of the track channels 50. Each of the track channels can be formed from a vertical space between a pair of the vertical flanges that are attached to the side walls 4, 6 of the chamber 1

Along the top edge 32 of the panel 30 can be a horizontal mounted float(s) 60 that can be mounted on a face of the skimmer panel 30, and have a gap, G spaced therebetween. Because of this gap, G, water is able to surround the upper float 60 on all sides to create buoyancy. Buoyancy would not be created if only the front and bottom sides of the float 60 were in contact with the adjacent water level. The gap, G, can have a width of approximately ¼" to approximately 2", and the term approximately can include +/−ten percent of the number value.

As shown in FIGS. 1-5, the hydraulic gradeline (height) at no flow remains as the height between in-flow pipe 3 and outflow pipe 9. As such, all of most of the potential flow is significantly constricted during low flow, which maximizes treatment of the incoming storm water.

This constricted flow allows for capturing contaminates such as foliage, litter, and sediments, and lighter than water liquids such as petroleum products in order to treat the storm water flow to prevent pollutants from being conveyed downstream to a receiving body of water. The intention is that debris or liquids that float due to buoyancy will not be able to move downward into the water column to pass through the open bottom of the skimmer. When the opening is relatively small under a skimmer it will have greater headloss, less water conveyance, but greater treatment. Here, the heavier contaminants settle in the settling chamber 12.

Figure 6:
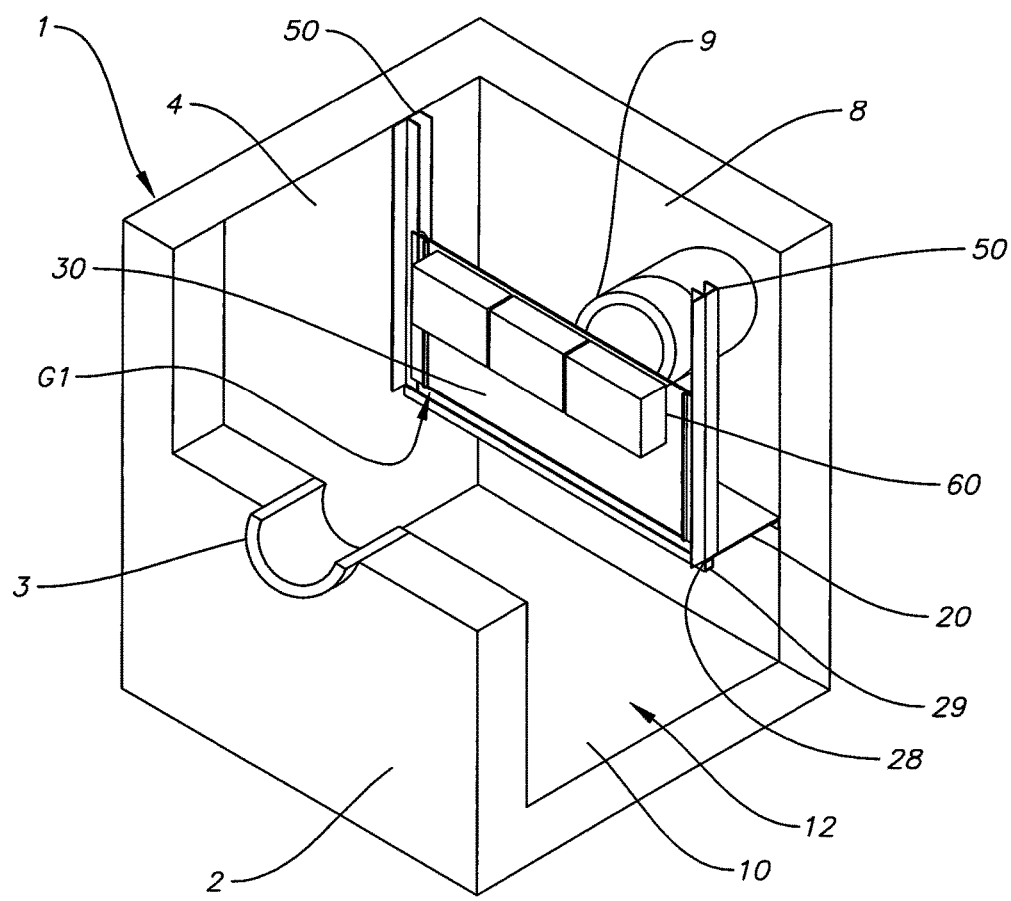
FIG. 6 is another upper perspective view of the chamber/vault with skimmer and float on a shelf of FIG. 1 during medium flow.
Figure 7:
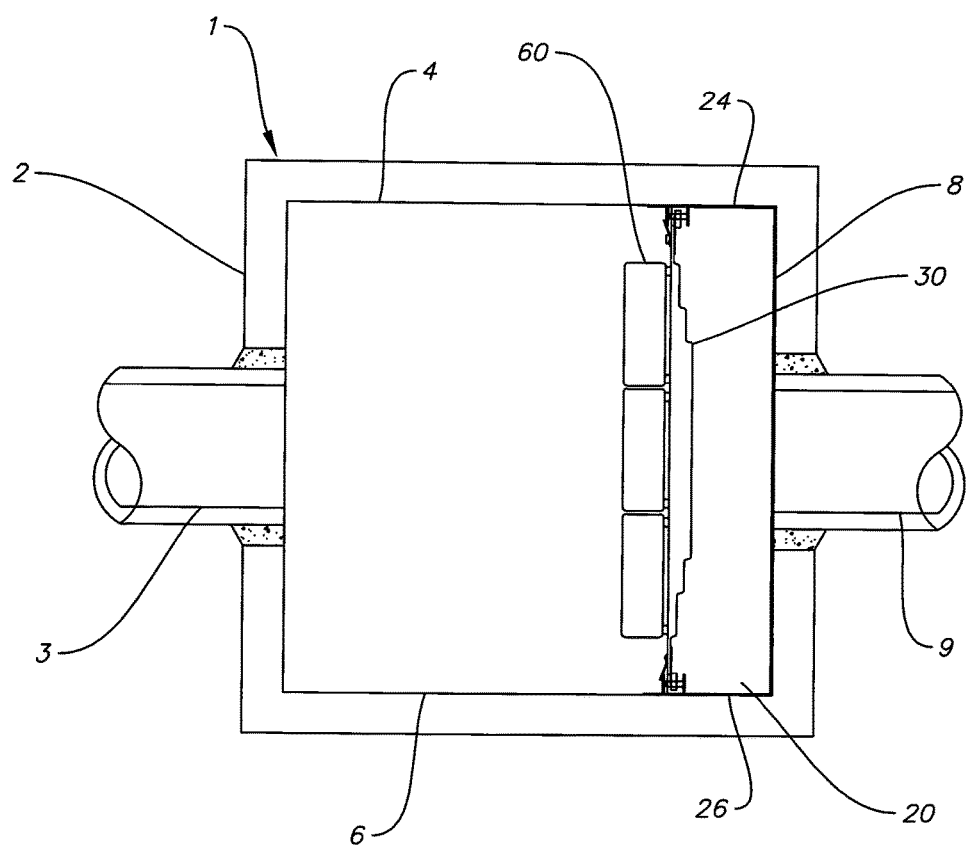
FIG. 7 is a top view of the chamber/vault with skimmer and float of FIG. 6.
Figure 8:
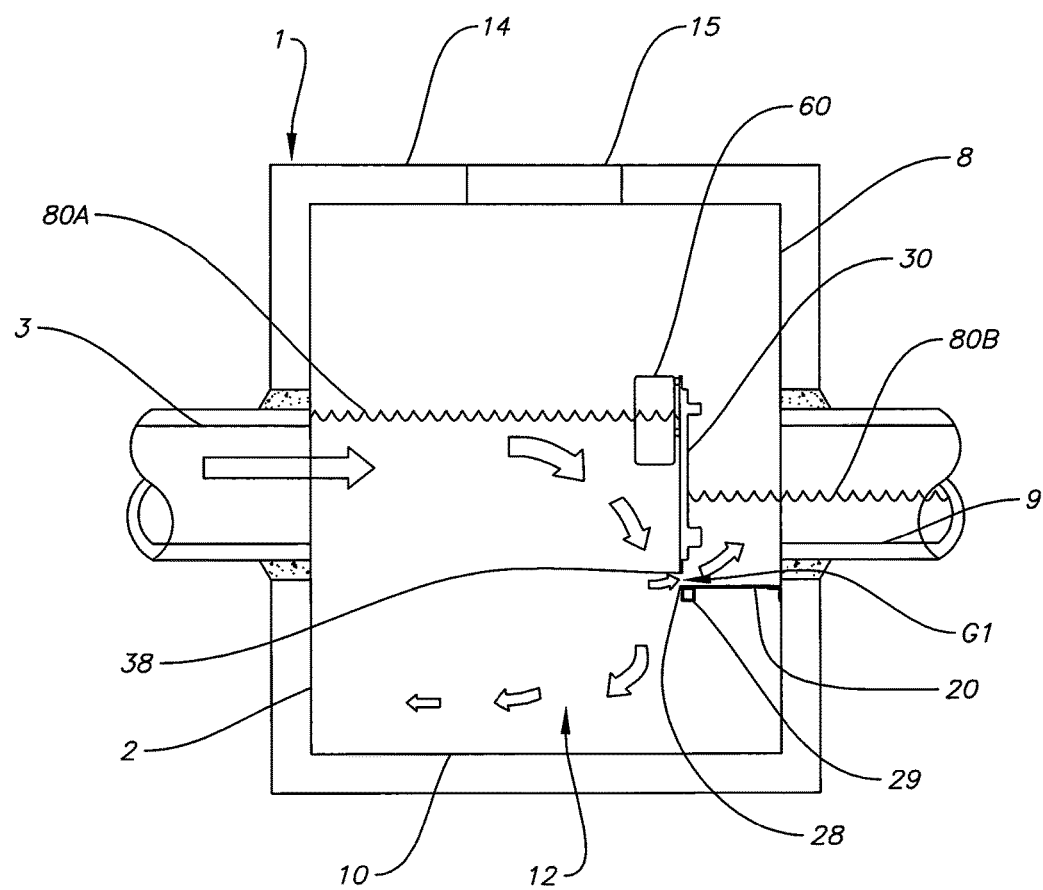
FIG. 8 is a side view of the chamber/vault with skimmer and float of FIG. 6 with side wall removed.
Figure 9:
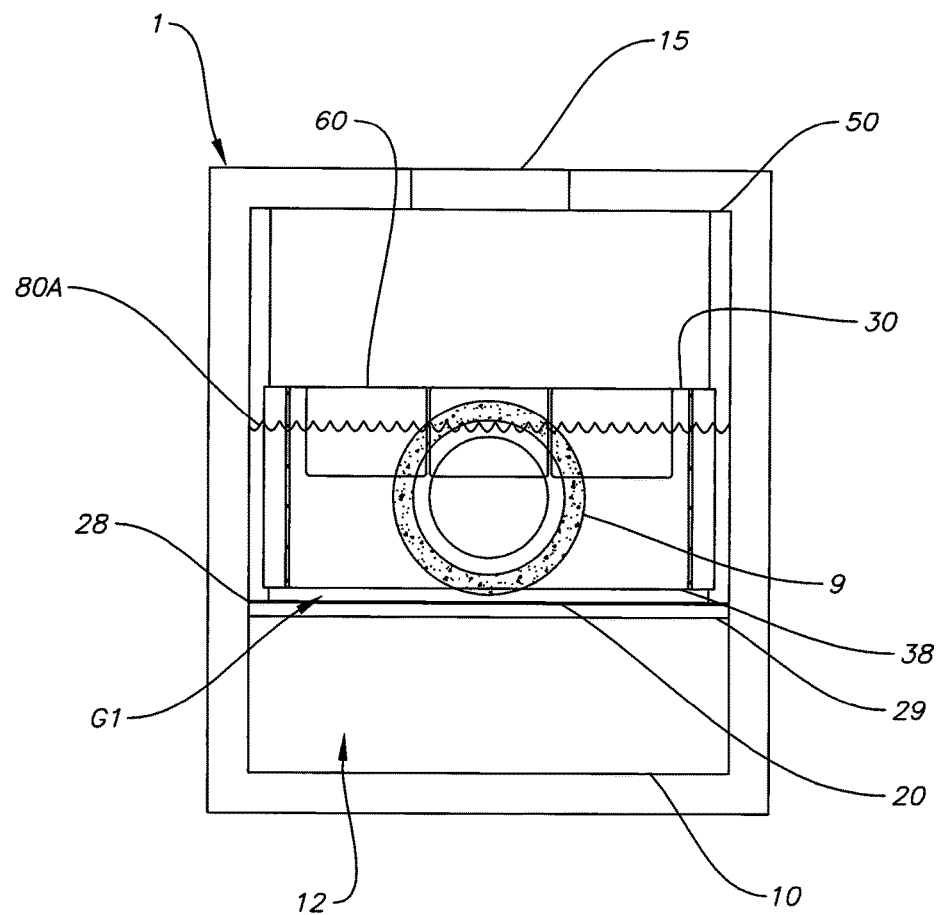
FIG. 9 is an end view from the outflow pipe view of the chamber/vault with skimmer and float of FIG. 6 with end wall removed.

FIG. 6 is another upper perspective view of the chamber/vault 1 with skimmer panel 30 with float 60 over an outer edge 28 of the shelf 20 of FIG. 1 during medium flow with gap, G1. FIG. 7 is a top view of the chamber/vault 1 with skimmer panel 30 and float 60 over the shelf 20 of FIG. 6. FIG. 8 is a side view of the chamber/vault 1 with skimmer panel 30 and float 60 of FIG. 6 with side wall 10 removed. FIG. 9 is an end view from the outflow pipe 9 of the chamber/vault 1 with skimmer panel 30 and float 60 over shelf 20 of FIG. 6 with end wall 8 removed.

Referring to FIGS. 6-9, a medium flow into in-flow pipe 3 into chamber/vault 1 can have an inflow hydraulic gradeline (height) 80A which can cause float 60 which is attached to side of top 32 of skimmer panel 30 to raise skimmer panel 30 within tracks 50(s). A gap G1 can form under the skimmer panel bottom 30 and the outer edge 28 of the shelf 20, which allows water to pass through the gap, G1 and back into the settling chamber area 12, and have a lower outflow hydraulic gradeline 80B when passing through outflow pipe 9.

As such, the combination of the floatable skimmer panel 30 with the flat solid shelf 20 having a gap G1 allows for capturing contaminates such as foliage, litter, and sediments, and lighter than water liquids such as petroleum products in order to treat the storm water flow to prevent pollutants from being conveyed downstream to a receiving body of water. The vertical sides of the panel 30 make use of a hydraulic pressure differential between the front side and back side of the skimmer panel 30 to direct the median water flow down and pass it through the open bottom gap 1. Once the flow passes through the open bottom flow will be conveyed downstream. The intention is that debris or liquids that float due to buoyancy will not be able to move downward into the water column to pass through the open bottom of the skimmer. When the opening is relatively small under a skimmer it will have greater headloss, less water conveyance, but greater treatment.

During medium flow and high flow, the flow volume is primarily responsible for raising the float 60 and skimmer 30 and not the flow rate. The gap, G1 can potentially have a width of approximately ¼" to approximately 2" or greater. The term approximately can include +/−ten percent of the number value.

Figure 10:
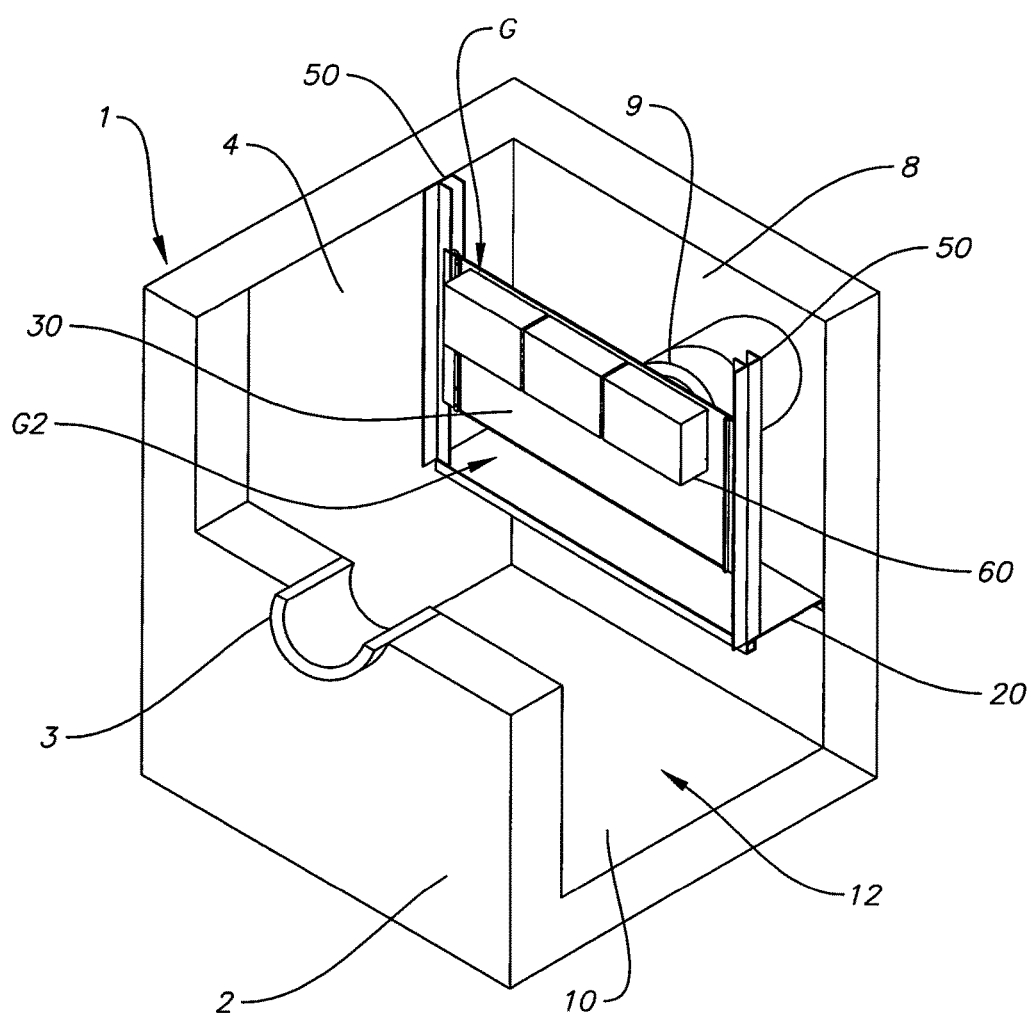
FIG. 10 is another upper perspective view of the chamber/vault with skimmer and float on a shelf of FIG. 1 during high flow.
Figure 11:
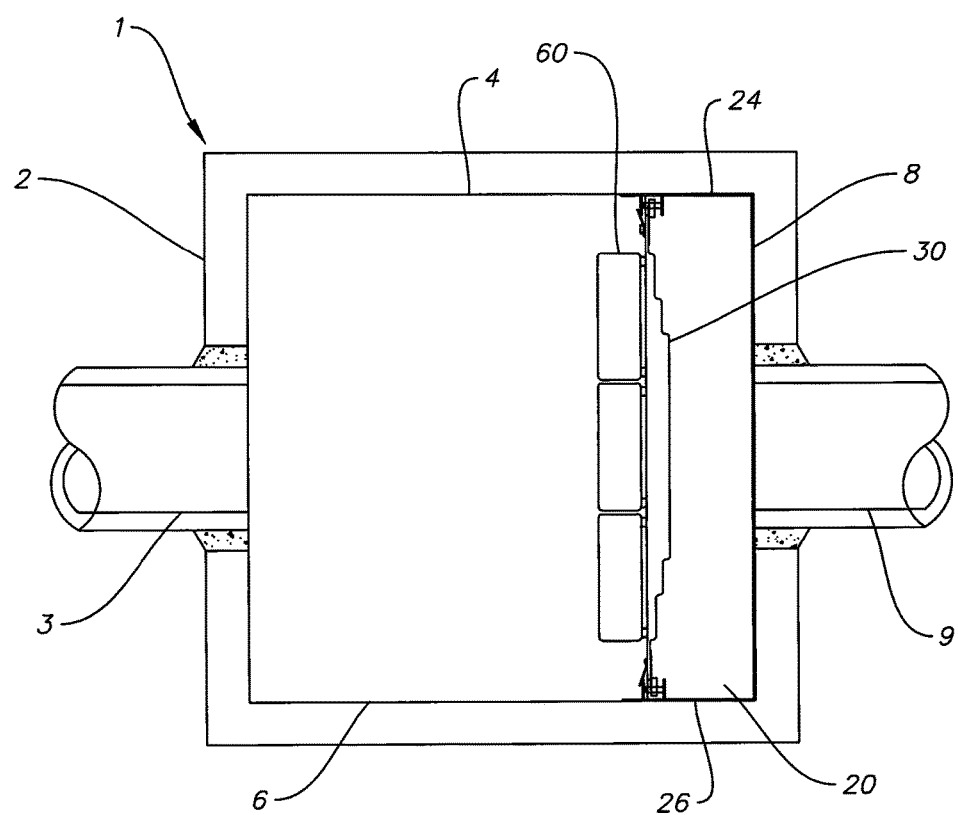
FIG. 11 is a top view of the chamber/vault with skimmer and float of FIG. 10.
Figure 12:
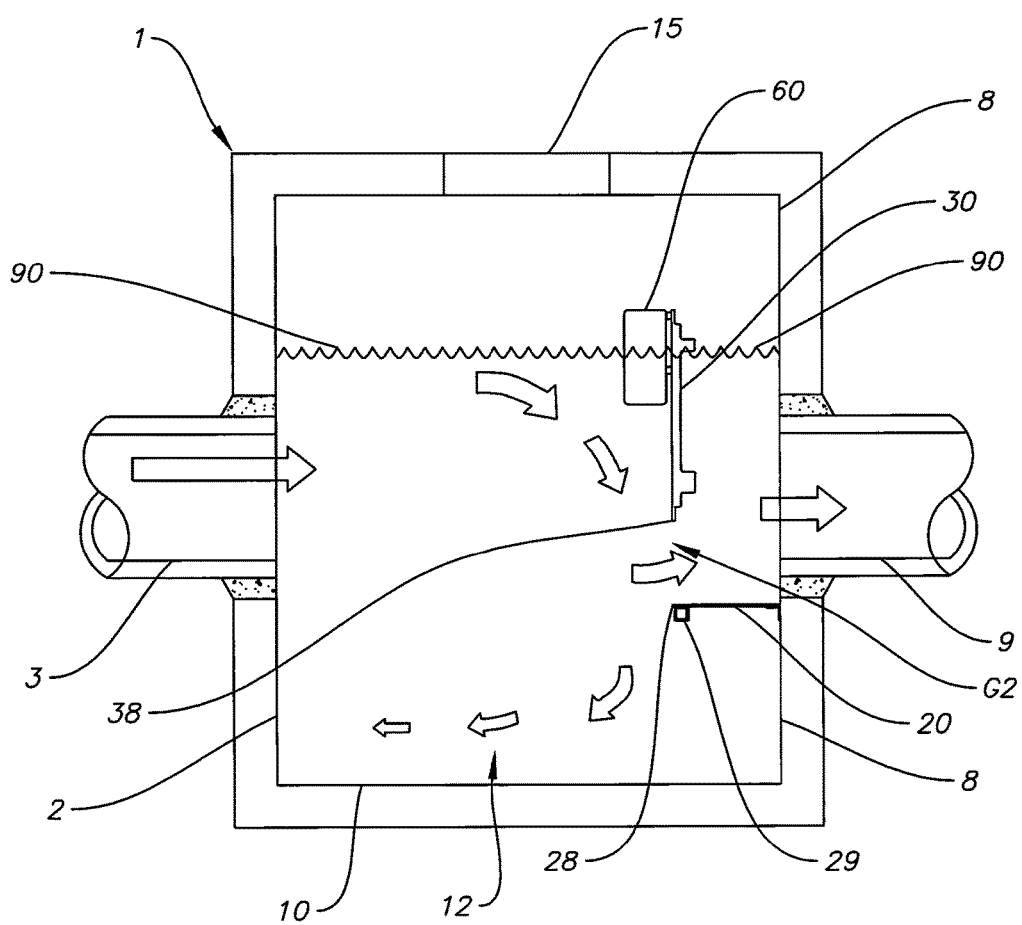
FIG. 12 is a side view of the chamber/vault with skimmer and float of FIG. 10 with side wall removed.
Figure 13:
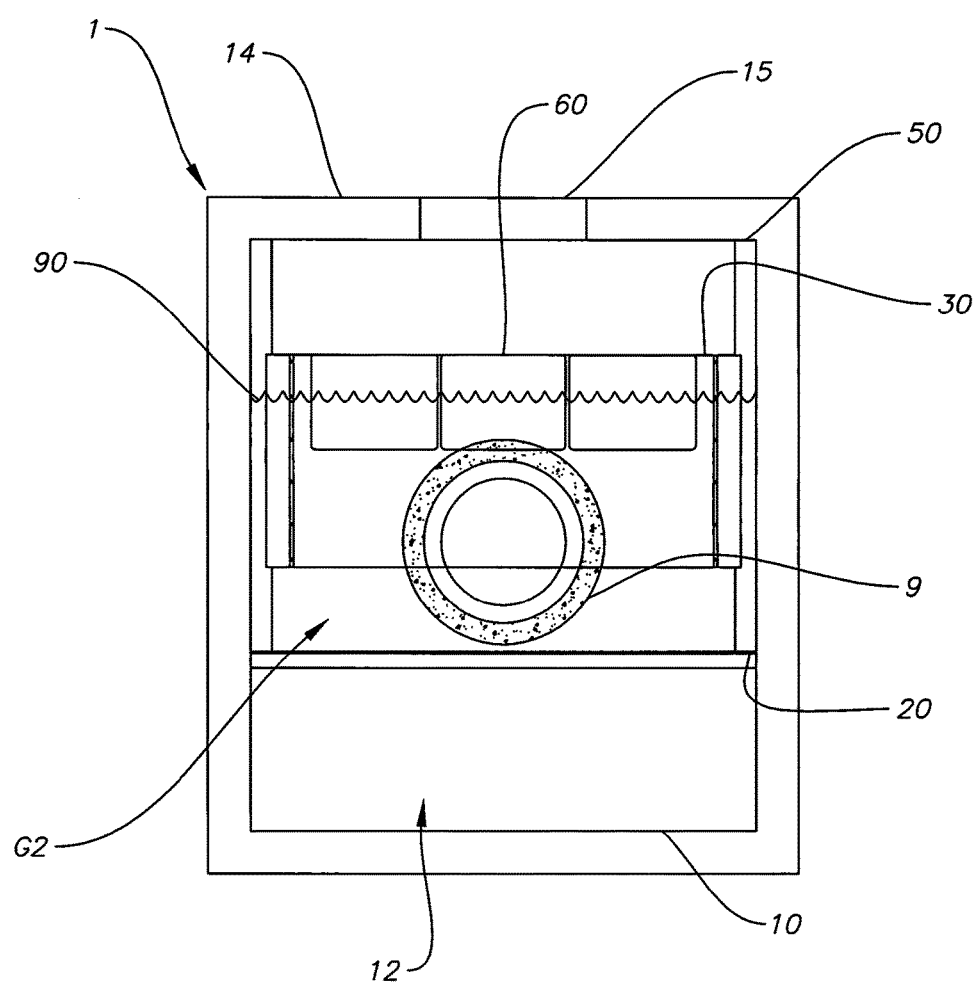
FIG. 13 is an end view from the outflow pipe of the chamber/vault with skimmer and float of FIG. 6 with end wall removed.

FIG. 10 is another upper perspective view of the chamber/vault 1 with skimmer panel 30 and float 60 on a shelf 20 of FIG. 1 during high flow. FIG. 11 is a top view of the chamber/vault 1 with skimmer panel 30 and float 60 over shelf 20 of FIG. 10. FIG. 12 is a side view of the chamber/vault 1 with skimmer panel 30 and float 60 over shelf 20 of FIG. 10 with side wall 6 removed. FIG. 13 is an end view from the outflow pipe 9 of the chamber/vault 1 with skimmer panel 30 and float 60 over shelf 20 of FIG. 6 with end wall 8 removed.

Referring to FIGS. 10-13, the inflow hydraulic gradeline 90 passing into in-flow pipe 2 at high flow raises the float 60 and skimmer panel 30 within track(s) 50 forming a large gap, G2 under the front edge 28 of the shelf and the raised skimmer panel bottom 38. The larger gap G2 allows water to flow to outflow pipe 9, and back into the settling chamber area 12. Gap, G2 is clearly larger than gap, G1. Here, the inflow hydraulic gradeline 90 at in-flow pipe 30 remains at the same height as the outflow hydraulic gradeline 90 at outflow pipe 9. The novel system allows for little or no constriction of water flow through the chamber/vault 1 which reduces and eliminates possible flooding before the incoming storm water reaches the in-flow pipe 3.

Multi-Chamber Vault

FIG. 14 is a perspective upper view of a multi-chamber vault 100 with track mounted skimmer panel 30 with float 60 on a shelf, 20 and baffles 110 in with no flow. FIG. 15 is a top view of the multi-chamber vault 100 with skimmer panel 30 and float 60 and baffles 110 of FIG. 14. FIG. 16 is a side view of the multi-chamber vault 100 with skimmer panel 30 and float 60 and baffles 110 of FIG. 14 with side wall 6 removed. FIG. 17 is an end view from the outflow pipe 9 of the multi-chamber vault 100 with skimmer panel 30 and float 60 and baffles 110 of FIG. 14 with end wall 8 removed.

Referring to FIGS. 14-17, with no flow 70 scenario the hydraulic gradeline 70 can remain at a low level in the chamber 1 with the flow level slightly lower than the bottom of the inlet pipe 3 and outlet pipe 9, and can function similar to the no flow that occurs in the previous embodiment with respect to FIGS. 1-5.

FIG. 18 is another upper perspective view of the multi-chamber vault 100 with skimmer panel 30 and float 60 and baffles 110 of FIG. 14 during medium flow. FIG. 19 is a top view of the multi-chamber vault 1 with skimmer panel 30 and float 60 and baffles 110 of FIG. 18. FIG. 20 is a side view of the multi-chamber vault 1 with skimmer panel 30 and float 60 and baffles 110 of FIG. 18 with side wall 6 removed. FIG. 21 is an end view from the outflow pipe 9 of the multi-chamber vault 100 with skimmer panel 30 and float 60 and baffles 110 of FIG. 18 with end wall 8 removed.

Referring to FIGS. 18-21, a medium flow into in-flow pipe 3 into chamber/vault 1 can have an inflow hydraulic gradeline (height) 80A which can cause float 60 which is attached to side of top 32 of skimmer panel 30 to raise skimmer panel 30 within tracks 50(s). A gap G1 can form under the skimmer panel bottom 30 and the outer edge 28 of the shelf 20, which allows water to pass through the gap, G1 and back into the settling chamber area 12, and have a lower outflow hydraulic gradeline 80B when passing through outflow pipe 9. The capture of contaminants and flow can work similar to the medium flow described in reference to the previous embodiment shown in FIGS. 6-9.

During medium flow and high flow, the flow volume is primarily responsible for raising the float 60 and skimmer 30 and not the flow rate. The gap, G1 can potentially have a width of approximately ¼" to approximately 2" or greater. The term approximately can include +/−ten percent of the number value.

FIG. 22 is another upper perspective view of the multi-chamber vault 100 with skimmer panel 30 and float 60 and baffles 110 of FIG. 14 during high flow. FIG. 23 is a top view of the multi-chamber vault 100 with skimmer panel 30 and float 60 and baffles 110 of FIG. 22. FIG. 24 is a side view of the multi-chamber vault 1 with skimmer panel 30 and float 60 and baffles 110 of FIG. 22 with side wall 6 removed. FIG. 25 is an end view from the outflow pipe 9 of the multi-chamber vault 100 with skimmer panel 30 and float 60 and baffles 110 of FIG. 22 with end wall 8 removed.

Referring to FIGS. 22-25, the inflow hydraulic gradeline 90 passing into in-flow pipe 2 at high flow raises the float 60 and skimmer panel 30 within track(s) 50 forming a large gap, G2 under the front edge 28 of the shelf and the raised skimmer panel bottom 38. The gap G2 allows water to flow to outflow pipe 9, and back into the settling chamber area 12. Gap, G2 can be larger than gap, G1. Here, the inflow hydraulic gradeline 90 at in-flow pipe 30 remains at the same height as the outflow hydraulic gradeline 90 at outflow pipe 9. The novel system allows for little or no constriction of water flow through the chamber/vault 1 which reduces and eliminates possible flooding before the incoming storm water reaches the in-flow pipe 3. The operation and function of the skimmer panel 30 with float 60 and gap, G2 is similar to the previous embodiment shown and described in reference to FIGS. 10-13.

Multi-Chamber Vault with Screen System

FIG. 26 is a perspective upper view of a multi-chamber vault 100 with track mounted skimmer panel 30 and float 60 on a shelf 20, and screen system 200 with no flow. FIG. 27 is a top view of the multi-chamber vault 100 with skimmer panel 30 and float 60 and screen system 200 of FIG. 26. FIG. 28 is a side view of the multi-chamber vault 100 with skimmer panel 30 and float 60 and screen system 200 of FIG. 26 with side wall 6 removed. FIG. 29 is an end view from the outflow pipe 9 of the multi-chamber vault 100 with skimmer panel 30 and float 60 and screen system 200 of FIG. 26 with end wall 8 removed.

The screen system 200 can be similar to and operate similar to the screen systems shown and described in U.S. Pat. Nos. 8,034,234; 8,491,797; and U.S. Pat. No. 8,366,923 to Happel, which are all incorporated by reference in their entirety.

Referring to FIGS. 26-29, the hydraulic gradeline (height) at no flow remains as the height between in-flow pipe 3 and outflow pipe 9. As such, all of most of the potential flow is significantly constricted during low flow, which maximizes treatment of the incoming storm water. The skimmer panel 30 and shelf 20 functions similar to the previous embodiment shown and described in reference to FIGS. 1-5.

FIG. 30 is a top view of the multi-chamber vault 100 with skimmer panel 30 and float 60 and screen system 200 over shelf 20 of FIG. 26 during medium flow. FIG. 31 is a side view of the multi-chamber vault 100 with skimmer panel 30 and float 60 and screen system 200 of FIG. 30 with side wall 6 removed. FIG. 32 is an end view from the outflow pipe 9 of the multi-chamber vault 100 with skimmer panel 30 and float 60 and screen system 200 of FIG. 30 with end wall 8 removed.

Referring to FIGS. 30-32, medium flow into in-flow pipe 3 into chamber/vault 1 can have an inflow hydraulic gradeline (height) 80A which can cause float 60 which is attached to side of top 32 of skimmer panel 30 to raise skimmer panel 30 within tracks 50(s). A gap G1 can form under the skimmer panel bottom 30 and the outer edge 28 of the shelf 20, which allows water to pass through the gap, G1 and back into the settling chamber area 12, and have a lower outflow hydraulic gradeline 80B when passing through outflow pipe 9. The floatable skimmer panel 30 with float 60 and shelf 20 can operate similarly to the medium flow scenario shown and described in reference to FIGS. 6-9.

During medium flow and high flow, the flow volume is primarily responsible for raising the float 60 and skimmer 30 and not the flow rate. The gap, G1 can potentially have a width of approximately ¼" to approximately 2" or greater. The term approximately can include +/−ten percent of the number value.

FIG. 33 is a top view of the multi-chamber vault 100 with skimmer panel 30 and float 60 over shelf 20 and screen system 200 of FIG. 26 during high flow. FIG. 34 is a side view of the multi-chamber vault 100 with skimmer panel 30 and float 60 and screen system 200 of FIG. 33 with side wall 6 removed. FIG. 35 is an end view from the outflow pipe 9 of the multi-chamber vault 200 with skimmer panel 20 and float 60 and screen system 200 of FIG. 33 with end wall 8 removed.

Referring to FIGS. 33-35, the inflow hydraulic gradeline 90 passing into in-flow pipe 2 at high flow raises the float 60 and skimmer panel 30 within track(s) 50 forming a large gap, G2 under the front edge 28 of the shelf and the raised skimmer panel bottom 38. The gap G2 allows water to flow to outflow pipe 9, and back into the settling chamber area 12. Gap G2, is larger than gap, G1. Here, the inflow hydraulic gradeline 90 at in-flow pipe 30 remains at the same height as the outflow hydraulic gradeline 90 at outflow pipe 9. The novel system allows for little or no constriction of water flow through the chamber/vault 1 which reduces and eliminates the possible flooding before the incoming storm water reaches the in-flow pipe 3. The skimmer panel 30 and shelf 20 operate similarly to the high flow scenario shown and described in reference to FIGS. 10-13 above.

Skimmer on Shelf with No Gap

FIG. 36 is a side view of the vault chamber 1 of the preceding figures during no flow of the skimmer panel 30 and float 60, with the skimmer panel 30 sitting on the shelf edge with no gap between the shelf and the skimmer. FIG. 36A is an enlarged view of the skimmer on shelf with no gap of FIG. 36.

FIGS. 36-36A show the position of the skimmer panel 30 with shelf 20 that was previously shown and described in reference to FIGS. 1-5, 14-17 and 26-29.

Skimmer Directly Over Top Edge of Shelf with Minimum Gap

FIG. 37 is a side view of the vault chamber 1 of the preceding figures with the skimmer panel 30 over the front shelf edge 28 with gap G4 between the top front edge 28 of the shelf 20 and the bottom 38 of the skimmer panel 30. FIG. 37A is an enlarged view of the skimmer panel 30 over the shelf 20 with top gap G4 of FIG. 37.

A minimum fixed gap, G4 can potentially have a width of approximately ¼" to approximately 2" or greater. The term approximately can include +/− ten percent of the number value.

Referring to FIGS. 37-37A, a minimum gap, G4, can be maintained so that there is always a minimum gap during no flow conditions, and the gap can increase during high flow conditions.

Having a minimum gap creates headloss and greater detention time for low to medium flows. Greater detention time translates into greater removal efficiency of pollutants. In addition, as the rain event ends the HGL on the upstream side of the skimmer will quickly lower to that of a static water flow condition. This will enable the debris captured in the screen system to quickly be stored above the HGL and dry out.

As the HGL rises with the association of larger flows the skimmer 30 will float up and the gap between the shelf 20 and bottom of the skimmer 30 will increase.

Skimmer Forward to and Over Top Edge of Shelf with Gap

FIG. 38 is a side view of the vault chamber 1 of the preceding figures during no flow of the skimmer panel 30 and float 60, with the skimmer panel 30 front of the front edge 28 of the shelf 20 with gap, G5 between the front edge 28 of the shelf 20 and the bottom 38 of the skimmer panel 30. FIG. 38A is an enlarged view of the skimmer panel 30 over the shelf 20 with gap G5 between the front edge 28 of the shelf 20 and the bottom 38 of the skimmer panel 30 of FIG. 38.

The gap G5, will restrict the flow to create greater detention time, however, there is no portion of the shelf in front of the skimmer for solids to collect and possibly clog the gap. In addition, gravity will be able to aid in keeping the gap free of debris during no flow conditions.

A minimum fixed gap, G5 can potentially have a width of approximately ¼" to approximately 2" or greater. The term approximately can include +/− ten percent of the number value.

Similar to gap, G4, the gap, G5 will get larger with higher gradelines. Gap between bottom edge of skimmer panel and front edge of shelf with bottom edge of skimmer panel hanging lower the front edge of shelf Skimmer Hanging Down in Front of Shelf with Gap FIG. 39 is a side view of the vault chamber 1 of the preceding figures during no flow of the skimmer panel 30 and float 60, with the skimmer panel 30 hanging down in front edge 28 of the shelf 20 with gap G6 between the hanging down skimmer panel 30 and front edge 28 of the shelf 20. FIG. 39A is an enlarged view of the hanging down skimmer panel 30 in front of shelf 20 with gap G6 of FIG. 38.

A minimum fixed gap, G6 can potentially have a width of approximately ¼" to approximately 2" or greater. The term approximately can include +/−ten percent of the number value.

Gap, G6 will restrict the flow to create greater detention time, however, there is no portion of the shelf in front of the skimmer for solids to collect and possibly clog the gap. In addition, gravity will be able to aid in keeping the gap free of debris during no flow conditions. Gap, G6 will also get larger with a higher gradeline.

Skimmer Bottom on Shelf Inside of Outer Edge of Shelf

FIG. 40 is a side view of the vault chamber 1 of the preceding figures during no flow of the skimmer 30 and float 60, with the skimmer bottom 38 located inside the outer edge 28 of the shelf 20. FIG. 40A is an enlarged view of the skimmer bottom 38 located on the shelf 20 inside of the outer edge 28 of the shelf 20.

The hydro-variant skimmer and shelf system can be adapted to be an internal component of a vault system or an open ditchline. The objective of the invention is to be a skimmer that constricts and restricts stormwater flow during low to medium flows. During high flows the hydraulics of the skimmer will automatically adjust to allow for greater conveyance of water flow. Stormwater treatment systems are generally more effective when more detention time is achieved within the treatment system. Whether the application is for use inside a vault system, open ditchline, pond conveyance, or media application, the greater treatment will be achieved with maximum detention time.

A typical vault system may have a variety of internal components. However, the vault system always an inflow conveyance and an outflow conveyance. When used in a Vault System the invention will typically be located adjacent to the outflow of the vault. The objective of the invention will be to create greater detention time within the vault. Greater detention time within a vault treatment system will achieve the following:

1. A higher hydraulic grade line within the vault will be achieved with greater detention time. This higher hydraulic grade line will influence the hydraulic grade line within the inflow pipe. This higher hydraulic gradeline in the inflow pipe will increase the cross-sectional conveyance of water flow. When the cross-sectional conveyance is increased and the volume of water flow remains the same, the linear velocity of water flow will reduce. Reduced linear velocity in the pipe will enable greater stratification of heavier that water solids within the pipe toward the bottom of the pipe. When heavier the water solids are conveyed along the bottom of a pipe, the distance that the solids must travel through the water column in the treatment vault to reach the settling zone of the treatment vault is reduced. This will enhance the potential capture of heavier than water solids within the treatment vault.

2. Comparing a low hydraulic grade line in a pipe to that of a high hydraulic grade line in a pipe, with both conditions having the same volume of flow.

The linear velocity of water flow in the condition with the low hydraulic gradeline will have a significantly higher linear velocity than that of the condition having the high hydraulic gradeline. The general shape of a pipe (round) has significantly greater cross-sectional conveyance midway up the pipe as compared to the cross-sectional conveyance at the bottom of a pipe. For example; For a 24" diameter pipe, the cross-sectional conveyance from the bottom to 3" up is 0.23 ft$^2$, the cross-sectional conveyance 3" tall midway in the pipe is 0.5 ft$^2$. The cross-sectional conveyance vertically midway in a pipe is greater than double that of the conveyance along the bottom of the pipe. Being able to take advantage of the cross-sectional conveyance midway in a pipe will dramatically reduce the linear velocity of the water flowing through the pipe. It is typical for treatment systems that settle heavier than water solids into lower settling chambers to function better when the linear velocity of water is reduced. Reduced linear inflow velocity will prevent inertia of water flow from streaming through a treatment system and bypassing the features of the treatment system. Lower linear velocity of inflow water will also help to avoid the re-suspension of heavier than water solids.

3. Treatment systems that have an internal screen system will have less hydraulic pressure difference between the inflow side of a screen and the outflow side of a screen. In addition, the higher hydraulic grade line will enable more screen area to be involved with the flow. The reduction in the difference for pressure between the inflow side of the screen and the outflow side of the screen will help to prevent foliage from compressing against the screen. With less foliage compression the water flow between the pieces of foliage will be greater. It is also likely that less foliage compression will prevent the screen from becoming completely blinded with no water flow.

4. Greater detention time will also increase the performance of treatment systems that make use of chemical treatment media for treatment. It is typical for all media to have an increase in chemical reactivity for pollutant removal with an increase in contact time.

The unique hydraulics of the invention enables a high level of detention time during low flows, and allows for the conveyance of large volumes of water during high flows. The skimmer will automatically adjust to the changing hydraulic gradeline as needed. This is accomplished by designing the skimmer so that it will float and move upward with a rising hydraulic gradeline. As the skimmer raises the gap between the horizontal shelf increases which increase the cross-sectional conveyance under the skimmer. For potential hydraulic conveyance having an opening under the skimmer provides far greater conveyance with significantly less headloss than a comparable conventional spill way in which water pours over top of a control structure. In most applications the hydro-variant skimmer will raise high enough to have no impact on headloss while continuing to function as a skimmer to prevent the passage of floatables.

Another unique feature of the hydro-variant skimmer is that it's buoyancy is determined by the hydraulic gradeline on the upstream side of the skimmer. Floats attached to the front side of the skimmer are mounted in such a way as to enable water to surround the float on all sides. The skimmer is a front side buoyancy skimmer. If there was no hydraulic gradeline present on the back side of the skimmer, the skimmer would still be able to rise based on only the hydraulic gradeline on the front side of the skimmer.

The invention can be adapted to vault systems that have 1 or multiple chambers. The shape of the vault system is not a limiting factor, and can be square, rectangular, round, or a cylinder.

FIG. 41 is a graph show of removal efficiency using the invention as compared to the prior art vaults based on tests completed in the spring of 2014. The results of the test indicate an approximately 15 to approximately 20 percent increase in the removal efficiency, for 100 micron particles, of the hydro-variant shelf system vs the same skimmer with no shelf.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A system for retrofitting storm water treatment chambers and vaults with a hydro-variant and skimmer shelf assembly, comprising:
    a floatable skimmer panel having sides adaptable for being slidably mounted to opposing walls in a storm water treatment chamber in front of an outlet port to the chamber, the floatable skimmer having a moveable panel with an upper edge, a lower edge and side edges; and
    a generally horizontal solid shelf adapted to be mounted to an outlet wall of the storm water treatment chamber, the shelf having a front edge adjacent to the lower edge of the moveable panel, a gap between the front edge of the shelf and the lower edge of the moveable panel during no flow conditions, wherein the floatable skimmer moves up and down with the flow rate of storm water passing into an inlet port to the chamber.

2. The system of claim 1, wherein the generally horizontal shelf is perpendicular to the outlet wall of the storm water treatment chamber.

3. The system of claim 1, wherein the generally horizontal shelf is
    at an incline to the outlet wall of the storm water treatment chamber.

4. The system of claim 1, further comprising:
    at least one float attached adjacent to the upper edge of the moveable panel.

5. The system of claim 1, further comprising:
a first track attached to one of the opposing walls of the chamber for allowing a first side edge of the moveable panel to slide up and down therein; and
a second track attached to one of the opposing walls of the chamber for allowing a second side edge of the moveable panel to slide up and down therein.

6. The system of claim 5, further comprising:
a first set of wheels attached to the first side edge of the moveable panel for rotating within the first track; and
a second set of wheels attached to the second side edge of the moveable panel for rotating within the second track.

7. The system of claim 6, wherein the first set of wheels, and the second set of wheels, each includes:
a plurality of centering wheels attached to each side edge of the panel which each rotates in a plane parallel to a surface plane of the panel; and
a plurality of load wheels attached to each side edge of the panel which each rotates in a plane perpendicular to the surface of the panel.

8. The system of claim 6, wherein the first set of wheels and the second set of wheels, each includes:
an upper centering wheel attached to an upper side edge of the panel which rotates in a plane parallel to the plane of the panel;
a plurality of load wheels attached along a middle side edge portion of the panel which rotates in a plane perpendicular to the plane of the panel; and
a lower centering wheel attached to a lower edge of the panel which rotates in a plane parallel to the plane of the panel.

9. The system of claim 8, wherein the plurality of load wheels includes: at least two load wheels equally spaced apart from one another.

10. The system of claim 8, wherein the plurality of load wheels includes: at least five load wheels equally spaced apart from one another.

11. The system of claim 8, wherein the plurality of load wheels includes: eight load wheels equally spaced apart from one another.

12. The system of claim 1, wherein the treatment chamber is a multi-chamber treatment chamber.

13. The system of claim 12, wherein the multi-chamber treatment chamber includes at least one vertical baffle.

14. The system of claim 13, wherein the multi-chamber treatment chamber includes a screen system over the at least one baffle.

15. A system for retrofitting storm water treatment chambers and vaults with a hydro-variant and skimmer shelf assembly, comprising:
a floatable skimmer panel having sides adaptable for being slidably mounted to opposing walls in a storm water treatment chamber in front of an outlet port to the chamber, the floatable skimmer having a moveable panel with an upper edge, a lower edge and side edges; and
a generally horizontal solid shelf adapted to be mounted to an outlet wall of the storm water treatment chamber, the shelf having a front edge adjacent to the lower edge of the moveable panel, wherein the floatable skimmer moves up and down with the flow rate of storm water passing into an inlet port to the chamber, wherein the lower edge of the skimmer panel has a gap opening on top of the front edge of the horizontal shelf during no flow conditions.

16. A system for retrofitting storm water treatment chambers and vaults with a hydro-variant and skimmer shelf assembly, comprising:
a floatable skimmer panel having sides adaptable for being slidably mounted to opposing walls in a storm water treatment chamber in front of an outlet port to the chamber, the floatable skimmer having a moveable panel with an upper edge, a lower edge and side edges; and
a generally horizontal solid shelf adapted to be mounted to an outlet wall of the storm water treatment chamber, the shelf having a front edge adjacent to the lower edge of the moveable panel, wherein the floatable skimmer moves up and down with the flow rate of storm water passing into an inlet port to the chamber, wherein the lower edge of the skimmer panel has a gap opening with the front edge of the horizontal shelf during no flow conditions, and the lower edge of the skimmer panel is at the same level with the front edge of the horizontal shelf.

17. A system for retrofitting storm water treatment chambers and vaults with a hydro-variant and skimmer shelf assembly, comprising:
a floatable skimmer panel having sides adaptable for being slidably mounted to opposing walls in a storm water treatment chamber in front of an outlet port to the chamber, the floatable skimmer having a moveable panel with an upper edge, a lower edge and side edges; and
a generally horizontal solid shelf adapted to be mounted to an outlet wall of the storm water treatment chamber, the shelf having a front edge adjacent to the lower edge of the moveable panel, wherein the floatable skimmer moves up and down with the flow rate of storm water passing into an inlet port to the chamber, wherein the lower edge of the skimmer panel hangs below on the front edge of the horizontal shelf with a gap therebetween during no flow conditions.

18. A system for providing storm water treatment in vaults and chambers with a hydro-variant and skimmer shelf assembly, comprising:
a floatable skimmer panel having sides adaptable for being slidably mounted to opposing walls in a storm water treatment chamber or vault in front of an outlet port to the chamber or vault, the floatable skimmer having a moveable panel with an upper edge, a lower edge and side edges; and
a generally horizontal solid shelf adapted to be mounted to an outlet wall of the storm water treatment chamber or vault, the shelf having a front edge adjacent to the lower edge of the moveable panel, the shelf located below the outlet port in the outlet wall, wherein the floatable skimmer moves up and down with the flow rate of storm water passing into an inlet port to the chamber or vault.

19. A method of constricting and restricting water during low and medium flows in a storm water treatment chamber or vault for maximizing treatment detention time, comprising the steps of:
providing a storm water treatment chamber or vault with an inlet wall having an inlet port, side walls, a bottom with at least one settling chamber, and an outlet wall with an outlet port;
providing a solid shelf having a front edge, side edges and a rear edge;
mounting the side edges and rear edge of the shelf in a generally horizontal orientation against the side walls and an outlet wall of the storm water treatment chamber and vault, the shelf located below the outlet port in the outlet wall;

mounting a vertically moveable floatable skimmer adjacent to the front edge of the horizontally oriented shelf;

constricting and restricting storm water flow passing into the inlet port of the chamber and vault during flow volumes into the chamber for maximum detention time to allow for capturing contaminants in the settling chamber during storm water treatment; and minimizing headloss and preventing flooding from occurring upstream from the storm water treatment chamber and vault.

\* \* \* \* \*